(12) United States Patent
Iyer et al.

(10) Patent No.: US 10,339,241 B1
(45) Date of Patent: Jul. 2, 2019

(54) METHODS FOR INCREMENTAL CIRCUIT DESIGN LEGALIZATION DURING PHYSICAL SYNTHESIS

(71) Applicant: Altera Corporation, San Jose, CA (US)

(72) Inventors: Mahesh A. Iyer, Fremont, CA (US); Robert Walker, Boulder, CO (US)

(73) Assignee: Altera Corporation, San Jose, CA (US)

( * ) Notice: Subject to any disclaimer, the term of this patent is extended or adjusted under 35 U.S.C. 154(b) by 139 days.

(21) Appl. No.: 15/154,785

(22) Filed: May 13, 2016

(51) Int. Cl.
*G06F 17/50* (2006.01)
*G06F 8/71* (2018.01)

(52) U.S. Cl.
CPC .............. *G06F 17/505* (2013.01); *G06F 8/71* (2013.01); *G06F 17/5045* (2013.01); *G06F 2217/04* (2013.01); *G06F 2217/84* (2013.01)

(58) Field of Classification Search
CPC ............. G06F 17/5045; G06F 17/5054; G06F 17/505; G06F 2217/04; G06F 2217/84; G06F 8/65; G06F 8/71
See application file for complete search history.

(56) References Cited

U.S. PATENT DOCUMENTS

| | | | | |
|---|---|---|---|---|
| 5,521,837 A * | 5/1996 | Frankle | ............... | G06F 17/5072 716/113 |
| 6,067,650 A * | 5/2000 | Beausang | ........ | G01R 31/31858 714/724 |
| 6,185,724 B1 * | 2/2001 | Ochotta | ............... | G06F 17/5072 716/123 |
| 6,539,535 B2 * | 3/2003 | Butts | .................... | G06F 17/5027 703/28 |
| 6,539,536 B1 * | 3/2003 | Singh | ................... | G06F 17/5045 716/102 |
| 6,668,358 B2 * | 12/2003 | Friend | ................... | G06F 17/505 716/103 |
| 7,191,426 B1 * | 3/2007 | Singh | ................... | G06F 17/5054 716/104 |
| 7,222,318 B2 * | 5/2007 | Srinivasan | ............ | G06F 17/505 716/114 |
| 7,257,800 B1 * | 8/2007 | Singh | .................. | G06F 17/5054 716/116 |

(Continued)

*Primary Examiner* — Helen Rossoshek
(74) *Attorney, Agent, or Firm* — Treyz Law Group, P.C.; Jason Tsai

(57) ABSTRACT

Configuration data for an integrated circuit may be generated using logic design equipment to implement a logic design on the integrated circuit. The equipment may perform incremental physical synthesis, timing optimization, and legalization operations on the logic design. The equipment may identify timing and legalization constraints and logic blocks that fail the timing constraints, and may determine whether modifying and/or moving the blocks to new locations satisfy the legalization constraints while improving the timing of the design. If the legalization constraints are not satisfied, the design equipment may recursively move non-critical logic blocks to new locations while ensuring that the legalization and timing constraints are satisfied for each move such that the timing of the design is improved. This may be repeated in multiple rounds of adjustment. A netlist may be generated after the moves are performed. The configuration data may be generated based on the netlist.

13 Claims, 12 Drawing Sheets

(56) References Cited

U.S. PATENT DOCUMENTS

| | | | | |
|---|---|---|---|---|
| 7,290,239 | B1* | 10/2007 | Singh | G06F 17/5054 716/104 |
| 7,360,190 | B1* | 4/2008 | Singh | G06F 17/5072 716/113 |
| 7,434,187 | B2* | 10/2008 | Brahme | G06F 17/505 703/14 |
| 7,607,118 | B1* | 10/2009 | Hutton | G06F 17/5031 716/108 |
| 7,676,782 | B2* | 3/2010 | Samanta | G06F 17/5054 326/39 |
| 7,814,452 | B1 | 10/2010 | Jang et al. | |
| 7,886,256 | B1 | 2/2011 | Jha et al. | |
| 7,996,797 | B1 | 8/2011 | Singh et al. | |
| 8,181,139 | B1* | 5/2012 | Chen | G06F 17/5072 716/116 |
| 8,510,688 | B1 | 8/2013 | Singh et al. | |
| 8,595,671 | B2* | 11/2013 | He | G06F 17/5054 716/116 |
| 8,856,702 | B1 | 10/2014 | Singh et al. | |
| 9,251,781 | B1* | 2/2016 | Ahmed | G01K 11/346 |
| 2009/0064068 | A1* | 3/2009 | Ng | G06F 17/5068 716/113 |
| 2013/0339913 | A1 | 12/2013 | Stavinov | |
| 2018/0101624 | A1* | 4/2018 | Dhar | G06F 17/5031 |

\* cited by examiner

METHODS FOR INCREMENTAL CIRCUIT DESIGN LEGALIZATION DURING PHYSICAL SYNTHESIS

BACKGROUND

This relates to integrated circuits and more particularly, to systems for designing logic circuitry on integrated circuit devices such as programmable integrated circuits.

Programmable integrated circuits are a type of integrated circuit that can be programmed by a user to implement a desired custom logic function. In a typical scenario, a logic designer uses computer-aided design tools to design a custom logic circuit that performs custom logic functions. When the design process is complete, the computer-aided design tools generate configuration data. The configuration data is loaded into memory elements to configure the devices to perform the functions of the custom logic circuit. Memory elements are often formed using random-access-memory (RAM) cells. Because the RAM cells are loaded with configuration data during device programming, the RAM cells are sometimes referred to as configuration memory or configuration random-access-memory cells (CRAM).

Integrated circuits such as programmable integrated circuits often include millions of gates and megabits of embedded memory. The complexity of a large system requires the use of electronic design automation (EDA) tools to create and optimize a logic design for the system onto an integrated circuit (target device). The tools may perform logic synthesis operations to generate a gate-level description of the logic design for implementation on a target programmable logic device. Logic synthesis also performs technology mapping to map the gates onto logic elements (resources) that are available on the target programmable logic device. These include, but are not limited to, lookup-tables (LUTs), flip-flops, block RAMS, and digital signal processing (DSP) elements. The logic elements are then placed and routed onto the target programmable device, while concurrently optimizing for timing, area, wiring, routing congestion, and power.

Synthesized designs are also subject to design constraints sometimes referred to herein as legality rules. The legality rules identify acceptable ("legal") placements for logic elements in the design. The tools perform timing analysis and other tests to determine whether the legality rules and timing constraints are satisfied in a process sometimes referred to herein as legalization.

Conventionally, physical synthesis is performed either before or after the placement phase in a design implementation flow. The tools then perform legalization after the post-placement physical synthesis. If the legality rules are not satisfied, all changes made by physical synthesis are scrapped even when only a small subset of the changes cause legalization errors. Furthermore, if the legalization succeeds, it is often possible that the timing of the design itself has deteriorated because the logic elements may have moved large distances to satisfy the legality rules. Performing legalization in this way can lead to excessive runtimes as well as fail to meet the timing constraints of the design.

SUMMARY

An integrated circuit may include memory elements arranged in rows and columns. The integrated circuit may be a programmable integrated circuit that can be programmed (e.g., using configuration data) by a user to implement desired custom logic functions (logic designs or systems). The configuration data may be generated using a logic design system (e.g., logic design equipment). When a target device such as a programmable integrated circuit is loaded with the configuration data, the target device may be programmed to implement the logic design identified by the configuration data.

The logic design equipment may perform multiple incremental physical synthesis, timing optimization, and legalization operations on the logic design prior to generating the configuration data. For example, the logic design equipment may identify a given logic block in the logic design that fails to satisfy timing constraints for the target device. The design equipment may identify a first target location in the logic design at which the given logic block satisfies the timing constraints for the target device. The design equipment may determine whether the first target location satisfies legalization constraints associated with the target device. For example, the design equipment may determine whether the first target location is occupied by a target logic block.

If the first location is occupied, the target block at the first location may be moved to a second target location at which the target logic block satisfies the timing constraints for the target device. The given logic block may then be moved to the emptied first target location. The design equipment may perform further physical synthesis operations on the logic design after the blocks have been moved. Subsequent adjustments and incremental legalization and optimization operations may be performed until a final, legal, and optimized logic design is generated (e.g., as a netlist file saved to memory on the design equipment). An assembler at the design equipment may assemble the configuration data (e.g., a configuration bit stream) based on the saved netlist and may transmit the assembled configuration data to a configuration device that loads the configuration data onto the target device to implement the final logic design.

As an example, the given logic block may be an improvable basic logic element (BLE) in the logic design whose initial placement introduces a first amount of signal delay to the logic design. The design equipment may identify a logic array block (LAB) in the logic design such that packing the improvable BLE into the identified LAB introduces a second amount of signal delay to the logic design that is less than the first amount of signal delay.

The design equipment may determine whether packing the improvable BLE into the identified LAB satisfies a legality (packing) constraint for the target device. In response to determining that packing the improvable BLE into the identified LAB fails to satisfy the legality constraint, the design equipment may determine whether moving a target BLE out of the identified LAB satisfies a timing constraint associated with the integrated circuit.

In response to determining that moving the target BLE out of the identified LAB fails to satisfy the timing constraint, the design equipment may pack the improvable BLE into an additional LAB in the logic design, such that packing the improvable BLE into the additional LAB introduces a third amount of signal delay to the logic design that is less than the first amount of signal delay. In response to determining that moving the target BLE out of the identified LAB satisfies the timing constraint, the design equipment may pack the target BLE into an additional LAB in the logic design and may pack the improvable BLE into the identified LAB. The design equipment may generate a gate-level netlist file of the logic design after packing the BLEs.

In accordance with any of the above arrangements, the logic design equipment may identify an improvable BLE in the logic design that introduces excessive signal delay to the logic design. The improvable BLE may, for example, be generated by performing a physical synthesis transform on the logic design. The logic design equipment may identify a move within the logic design for the improvable BLE. The equipment may perform a timing analysis operation to determine whether performing the move within the logic design for the improvable BLE improves timing for the logic design. In response to determining that performing the move improves the timing for the logic design, the design equipment may accept the move within the logic design for the improvable BLE. In response to determining that performing the move does not improve the timing of the logic design, the design equipment may reject the move within the logic design for the improvable BLE and may identify other improvable BLEs in the logic design for moving. The design equipment may identify whether a location to which the improvable BLE is to be moved is occupied by an additional BLE. If this is the case, the additional BLE may be moved to a second target location such that the timing of the logic design remains satisfactory.

In accordance with any of the above arrangements, non-transitory computer-readable storage media may include instructions for performing the operations described herein.

Further features of the present invention, its nature and various advantages will be more apparent from the accompanying drawings and the following detailed description.

DETAILED DESCRIPTION

Embodiments of the present invention relate to integrated circuits and, more particularly, to ways for improving processing efficiency in generating logic designs that are implemented on the integrated circuits.

It will be obvious to one skilled in the art, that the present exemplary embodiments may be practiced without some or all of these specific details. In other instances, well-known operations have not been described in detail in order not to unnecessarily obscure the present embodiments.

Figure 1:
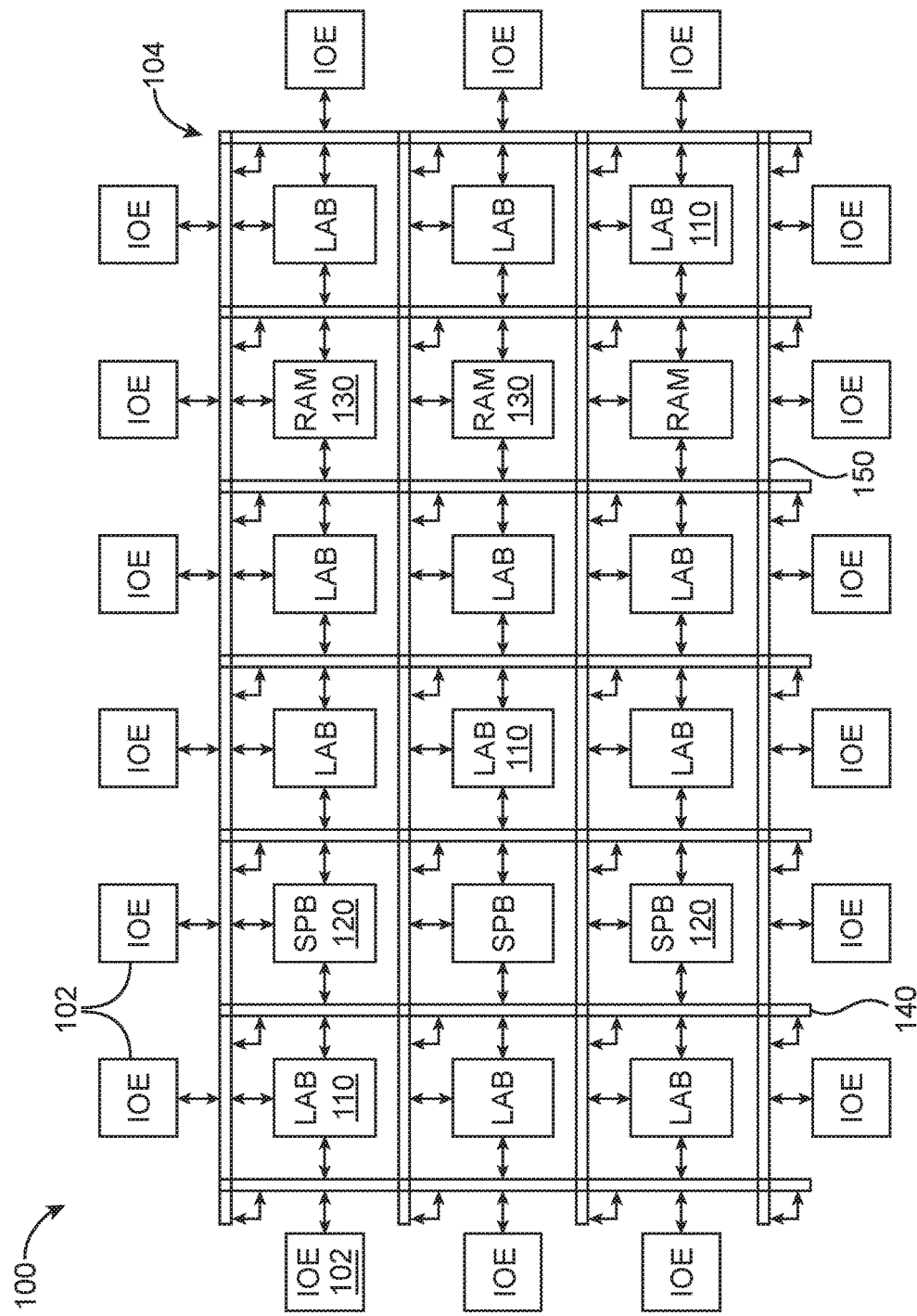
FIG. 1 is a diagram of an illustrative integrated circuit that includes core logic circuitry such as logic array blocks (LABs) and specialized processing blocks (SPBs) and that includes associated peripheral input-output elements (IOEs) in accordance with an embodiment.

FIG. 1 is a diagram of an integrated circuit 100 that can be used to implement logic designs. Integrated circuit 100 may be a memory chip, a digital signal processor (DSP), a microprocessor, an application specific integrated circuit (ASIC), or a programmable integrated circuit. Examples of programmable integrated circuits include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), or other suitable integrated circuits.

Integrated circuits such as programmable integrated circuits use programmable memory elements to store configuration data. During programming of a programmable integrated circuit, configuration data is loaded into the memory elements. During normal operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

Memory elements may be organized in arrays having numerous rows and columns. For example, memory array circuitry may be formed in hundreds or thousands of rows and columns on a programmable logic device integrated circuit. Programmable integrated circuit 100 of FIG. 1 is an example of an illustrative integrated circuit on which memory array circuitry may be formed.

As shown in FIG. 1, integrated circuit 100 may include core logic circuitry 104 and input-output (IO) circuitry such as IO circuitry 102 formed along each edge of integrated circuit 100 and surrounding logic circuitry 104. Input-output circuitry 102 may be used for driving signals off of device 100 and for receiving signals (e.g., power supply voltage signals, data signals, clock signals, address signals, commands, and other control signals, etc.) from other external devices.

In the example of FIG. 1, input/output elements 102 are located around the periphery of chip 100. If desired, the device 100 input/output elements 102 may form one or more columns of input/output elements that are located anywhere on the device (e.g., distributed evenly across the width of the device). If desired, input/output elements 102 may form one or more rows of input/output elements (e.g., distributed across the height of the device). If desired, input/output elements 102 may form islands of input/output elements that are distributed over the surface of the device or clustered in selected areas.

In scenarios where integrated 100 is a programmable logic device (PLD), core logic 104 may include a two-dimensional array of functional blocks, including logic array blocks (LABs) 110 and other functional blocks, such as random access memory (RAM) blocks 130 and configurable specialized processing blocks such as specialized processing blocks (SPB) 120, as examples. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), configuration memory elements, or programmable memory elements.

If desired, device 100 may include programmable interconnect circuitry such as vertical routing channels 140 (e.g., interconnects formed along a vertical axis of device 100) and horizontal routing channels 150 (e.g., interconnects formed along a horizontal axis of device 100). Each routing channel may include at least one track to route at least one wire, for example. If desired, the interconnect circuitry may include double data rate interconnections and/or single data rate interconnections.

This example is merely illustrative. In general, any other desired routing topologies may be formed on device 100. For example, the routing topology may include diagonal wires, horizontal wires, and vertical wires along different parts of their extent, and/or wires that are perpendicular to the device plane (e.g., in scenarios where device 100 is a three dimensional integrated circuit). The routing topology may include global wires that span substantially all of device 100, fractional global wires such as wires that span part of device 100, staggered wires of a particular length, smaller local wires, or any other suitable interconnection resources. If desired, the functional blocks of integrated circuit 100 may be arranged in one or more levels or layers in which multiple functional blocks are interconnected to form still larger blocks.

Figure 2:
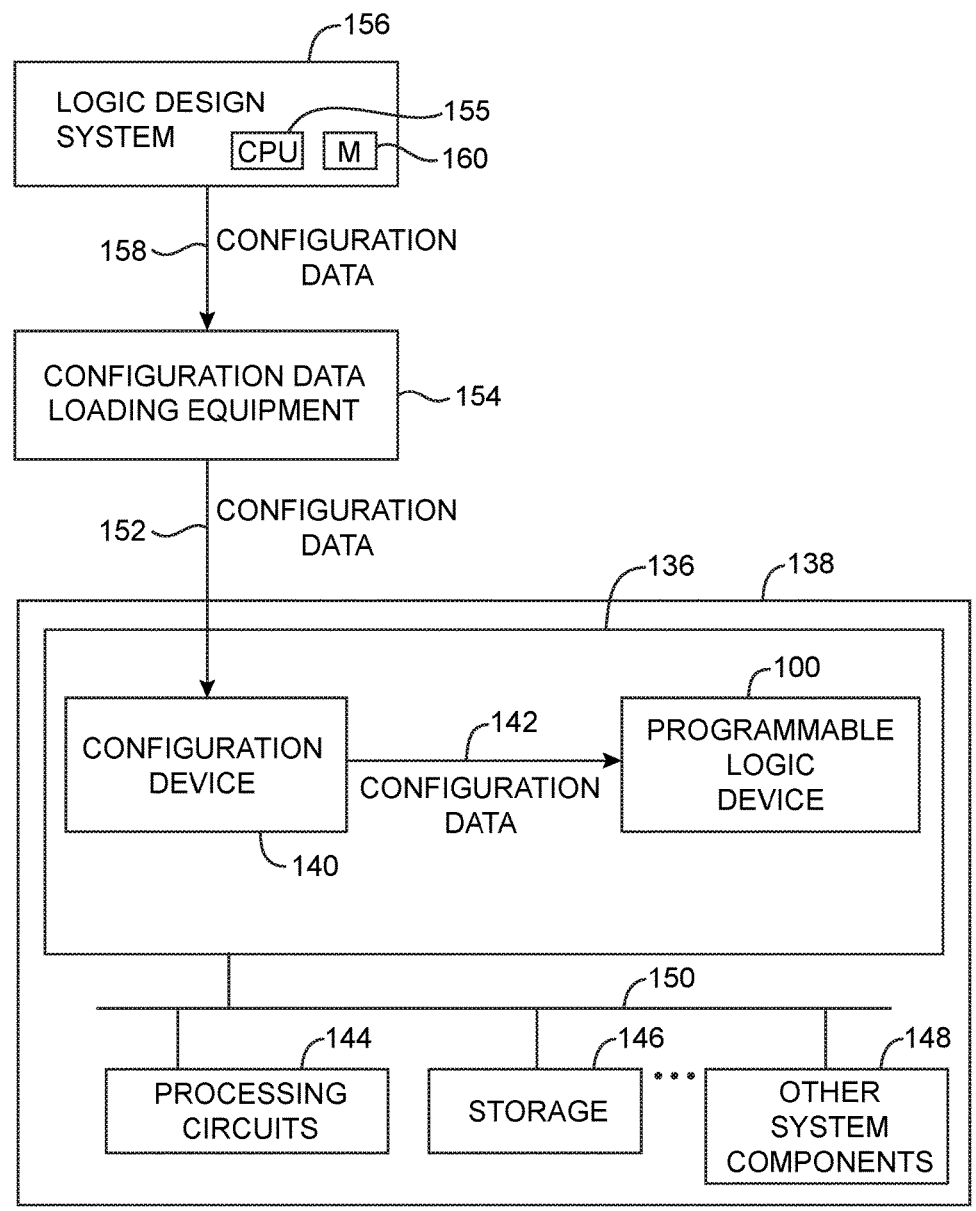
FIG. 2 is an illustrative diagram showing how configuration data may be generated by a logic design system and loaded into a programmable device in accordance with an embodiment of the present invention.

The various structures and components that are included in an integrated circuit can be designed using a circuit design system. An illustrative system environment for device 100 is shown in FIG. 2. Device 100 may, for example, be mounted on a board 136 in a system 138. In general, programmable logic device 100 may receive configuration data from programming equipment or from other suitable equipment or device. In the example of FIG. 2, programmable logic device 100 is the type of programmable logic device that receives configuration data from an associated integrated circuit 140. With this type of arrangement, circuit 140 may, if desired, be mounted on the same board 136 as programmable logic device 100. Circuit 140 may be an erasable-programmable read-only memory (EPROM) chip, a programmable logic device configuration data loading chip with built-in memory (sometimes referred to as a configuration device), or other suitable device. When system 138 boots up (or at another suitable time), the configuration data for configuring the programmable logic device may be supplied to the programmable logic device from device 140, as shown schematically by path 142. The configuration data that is supplied to the programmable logic device may be stored in the programmable logic device in its configuration random-access-memory elements.

System 138 may include processing circuits 144, storage 146, and other system components 148 that communicate with device 100. The components of system 138 may be located on one or more boards such as board 136 or other suitable mounting structures or housings and may be interconnected by buses and other electrical paths 150. If desired, programmable device 100 may be loaded with configuration data without mounting device 100 and/or configuration device 140 to board 136 (e.g., using any desired configuration data loading equipment).

Configuration device 140 may be supplied with the configuration data for device 100 (sometimes referred to herein as target circuit or target device 100) over a path such as path 152. Configuration device 140 may, for example, receive the configuration data from configuration data loading equipment 154 or other suitable equipment that stores this data in configuration device 140. Device 140 may be loaded with data before or after installation on board 136.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 156 (sometimes referred to herein as logic design equipment 156, logic design computer 156, logic design processor 156, logic design computing equipment 156, logic design circuitry 156, or data stream generation circuitry 156) may be provided to equipment 154 over a path such as path 158. Equipment 154 provides the configuration data to device 140, so that device 140 can later provide this configuration data to the programmable logic device 100 over path 142. System 156 may be based on one or more computers and one or more software programs. In general, software and data may be stored on any computer-readable medium (storage) in system 156 and is shown schematically as storage 160 in FIG. 2. System 156 may include processing circuitry in the form of one or more processors such as central processing unit (CPU) 155. In general, any desired processing circuitry may be formed on system 156.

In a typical scenario, logic design system 156 is used by a logic designer to create a custom circuit (logic) design. For example, the logic designer may provide input commands to logic design system 156 (e.g., by selecting on screen commands displayed on a display screen, by entering commands using a user input device such as a mouse and/or keyboard, etc.). The system 156 produces corresponding configuration data which is provided to configuration device 140. Upon power-up, configuration device 140 and data loading circuitry on programmable logic device 100 are used to load the configuration data into CRAM cells on device 100. Device 100 may then be used in normal operation of system 138. The example of FIG. 2 is merely illustrative. In general, any desired system may be used to load configuration data generated by logic design system 156 onto programmable logic device 100.

Figure 3:
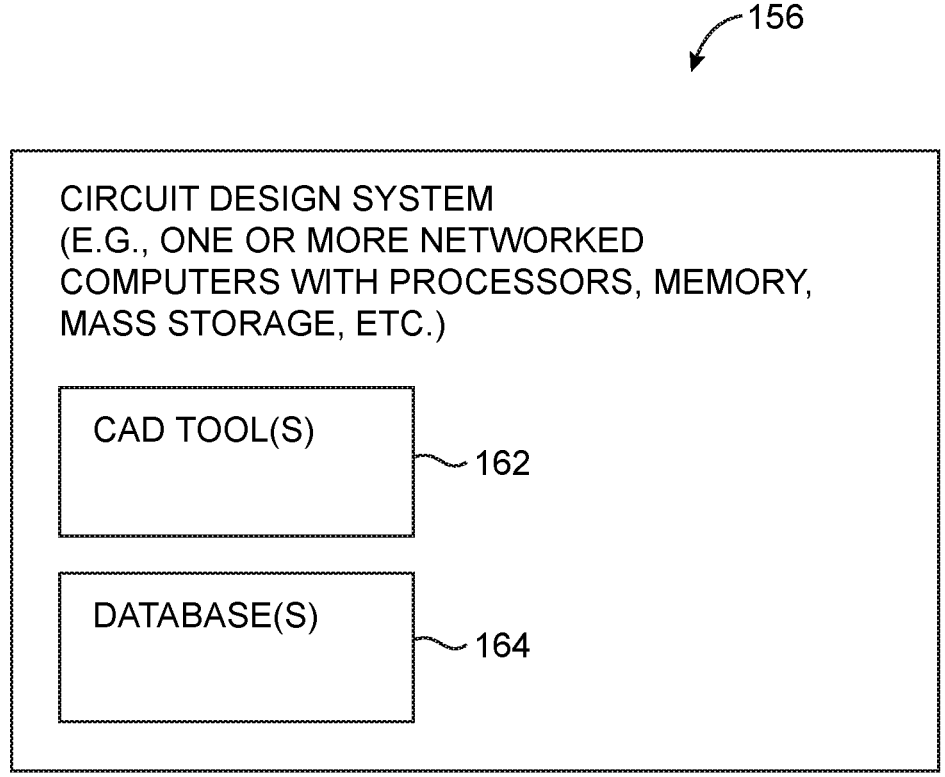
FIG. 3 is a diagram of a circuit design system that may be used to design integrated circuits in accordance with an embodiment.

An illustrative circuit (logic) design system 156 in accordance with the present invention is shown in FIG. 3. System 156 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 162 and databases 164 reside on system 156. During operation, executable software such as the software of computer aided design tools 162 runs on the processor(s) of system 156. Databases 164 are used to store data for the operation of system 156. In general, software and data may be stored on any computer-readable medium (storage) in system 156. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 156 is installed, the storage of system 156 has instructions and data that cause the computing equipment in system 156 to execute various methods (processes). When performing these processes, the computing equipment is configured to implement the functions of the circuit design system.

The computer aided design (CAD) tools 162, some or all of which are sometimes referred to collectively as a CAD tool or an electronic design automation (EDA) tool, may be provided by a single vendor or by multiple vendors. Tools 162 may be provided as one or more suites of tools (e.g., a compiler suite for performing tasks associated with implementing a circuit design in a programmable logic device) and/or as one or more separate software components (tools). Database(s) 164 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
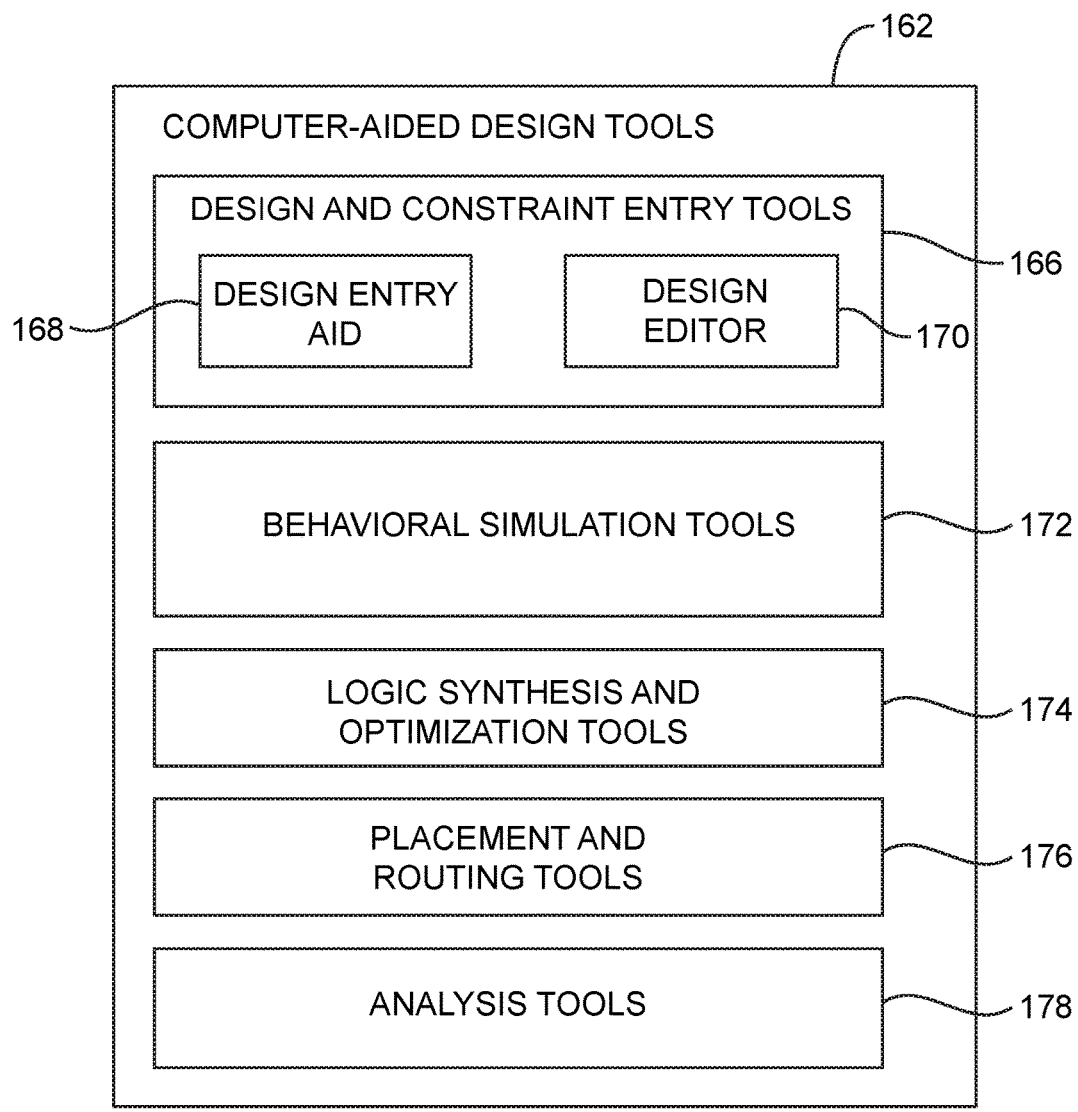
FIG. 4 is a diagram of illustrative computer-aided design (CAD) tools that may be used in a circuit design system in accordance with an embodiment.

Illustrative computer aided design tools 162 that may be used in a circuit design system such as circuit design system 156 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 166. Design and constraint entry tools 166 may include tools such as design and constraint entry aid 168 and design editor 170. Design and constraint entry aids such as aid 168 may be used to help a circuit designer locate a desired design from a library of existing circuit designs and may provide computer-aided assistance to the circuit designer for entering (specifying) the desired circuit design.

As an example, design and constraint entry aid 168 may be used to present screens of options for a user. The user may click on on-screen options to select whether the circuit being designed should have certain features. Design editor 170 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 166 may be used to allow a circuit designer to provide a desired circuit design using any suitable format. For example, design and constraint entry tools 166 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 166 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 166 may allow the circuit designer to provide a circuit design to the circuit design system 156 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 170. Blocks of code may be imported from user-maintained or commercial libraries if desired.

After the design has been entered using design and constraint entry tools 166, behavioral simulation tools 172 may be used to simulate the functional performance of the circuit design. If the functional performance of the design is incomplete or incorrect, the circuit designer can make changes to the circuit design using design and constraint entry tools 166. The functional operation of the new circuit design may be verified using behavioral simulation tools 172 before synthesis operations have been performed using tools 176. Simulation tools such as behavioral simulation tools 172 may also be used at other stages in the design flow if desired (e.g., during logic synthesis). The output of the behavioral simulation tools 172 may be provided to the circuit designer in any suitable format (e.g., truth tables, timing diagrams, etc.).

Once the functional operation of the circuit design has been determined to be satisfactory, logic synthesis and optimization tools 174 may generate a gate-level netlist of the circuit design, for example using gates from a particular library pertaining to a targeted process supported by a foundry, which has been selected to produce the integrated circuit. Alternatively, logic synthesis and optimization tools 174 may generate a gate-level netlist of the circuit design using gates of a targeted programmable logic device such as device 100 (i.e., in the logic and interconnect resources of a particular programmable logic device product or product family).

Logic synthesis and optimization tools 174 may optimize the design by making appropriate selections of hardware to implement different logic functions in the circuit design based on the circuit design data and constraint data entered by the logic designer using tools 166. Tools 174 may optimize the design while ensuring that device constraints are satisfied. Such device constrains may include legality rules (sometimes referred to herein as legality constraints) and timing constraints. The legality rules may specify what placement of logic elements within the design and what interconnections are legal or illegal (e.g., which placements and interconnections satisfy or do not satisfy the legality rules). Examples of legality constraints that may be imposed include rules about where certain logic elements can be placed, rules dictating that multiple elements cannot share a single location on the design, clustering rules, rules dictating how elements can be connected, clocking rules (e.g., constraints on how each logic element in the design is clocked or how many clocks each logic cluster may receive), packing rules, or other desired legality constraints.

The timing constraints may provide constraints on timing within the design. The timing constraints may, for example, include rules limiting the maximum allowable signal propagation delay between each element in the logic design or on a combinational path connecting the logic elements. The legality rules and timing constraints may be provided by a logic designer operating system 162, by a manufacturer of integrated circuit 100 or system 138, by regulatory standards, etc. Tools 174 may perform optimizations to the logic design while ensuring that any optimizations maintain or satisfy both the legality constraints and the timing constraints.

After logic synthesis and optimization using tools 174, the circuit design system may use tools such as placement and routing tools 176 to perform physical design steps (layout and routing operations). Placement and routing tools 176 are used to determine where to place each gate of the gate-level netlist produced by tools 174. For example, if two counters interact with each other, the placement and routing tools 176 may locate these counters in adjacent regions to reduce interconnect delays or to satisfy timing requirements specifying the maximum permitted interconnect delay. The placement and routing tools 176 create orderly and efficient implementations of circuit designs for any targeted integrated circuit (e.g., for a given programmable integrated circuit such as a field-programmable gate array (FPGA)).

Tools such as tools 174 and 176 may be part of a compiler suite (e.g., part of a suite of compiler tools provided by a programmable logic device vendor). In accordance with the present invention, tools such as tools 174, 176, and 178 may also include timing analysis tools such as timing estimators. This allows tools 174 and 176 to satisfy performance requirements (e.g., timing requirements) before actually producing the integrated circuit. As an example, tools 174 and 176 may partition data paths into subsets of data paths and instantiate additional cascaded processing and storage circuitry for each newly created subset of data paths. If desired, tools 174 and 176 may register pipeline selected paths in order to provide for higher clock rates in exchange for increased latency.

After a layout implementation of the desired circuit design has been generated using placement and routing tools 176, the implementation of the design may be analyzed and tested using analysis tools 178. After satisfactory optimization operations have been completed using tools 162 and depending on the targeted integrated circuit technology, tools 120 may produce a mask-level layout description of the integrated circuit or configuration data for programming the programmable logic device.

When performing synthesis and optimization, the logic design is specified by the logic designer in an HDL file or other formats as specified at design constraint entry tools 166. The logic synthesis and technology mapping process map the optimized design into basic logic elements (BLEs) which may include, for example, look-up-tables (LUTs), latches such as flip-flops, or combinations of LUTs and flip-flops, block RAMS, DSPs, carry chains, etc. The BLEs in the synthesized netlist are placed at particular locations and the BLEs are interconnected in a particular way so as to implement desired Boolean logic functions (e.g., AND gates, NOR gates, OR gates, XOR gates, NAND gates, pass gates, etc.) in the design.

Each possible arrangement/placement of the BLEs may have corresponding timing implications (e.g., some arrangements may involve longer signal propagation delays as signals pass through the BLEs than others), may occupy different amounts of space within the target device (e.g., some arrangements may require more area than other arrangements), and may consume different amounts of power in the target device when implemented. The optimization operations may optimize these factors to identify an optimal arrangement for the BLEs to implement a desired logic design. Operations may be performed to ensure that the optimal arrangement also satisfies legality constraints. If the optimal arrangement does not satisfy the legality constraints, a different arrangement must be used until legality is satisfied. The process of testing whether the design satisfies the legality constraints and adjusting the design until the legality constraints are satisfied is sometimes referred to herein as legalization.

The placement operations may involve arranging (packing or clustering) the BLEs into adaptive logic modules (ALMs). ALMs may serve as discrete logical elements that include one or more BLEs arranged and interconnected in a predetermined manner. The placement operations may further involve arranging (packing or clustering) the ALMs into logic array blocks (LABs) 110 as shown in FIG. 1. The LABs may serve as discrete logical elements that include one or more ALMs arranged and interconnected in a predetermined manner. The LABs may be subject to legalization constraints. The optimization operations may identify an optimal arrangement of BLEs packed within ALMs and LABs while ensuring that all legality constraints imposed by the FPGA architecture are satisfied.

In some scenarios, physical synthesis for the entire logic design is performed and a corresponding final netlist is saved to disk. In such a scenario, placement and clustering operations are only performed a single time prior to the physical synthesis. A legalization operation is then performed after the physical synthesis operation is performed for the entire design (e.g., after the final netlist is saved). If the synthesized design does not satisfy the legalization constraints, the synthesized design (e.g., the saved final netlist) is scrapped and the original netlist is restored. It should be noted that even if many of the physical synthesis transforms could have been successfully legalized, the ones that cannot be legalized correctly contribute to rejecting all the transforms. If the legalization process succeeds, then the design is verified whether the timing constraints are still satisfied after the legalization. If the timing of the design has gotten worse, then all of the physical synthesis transforms are rejected and the design is restored to its original form. Otherwise, all physical synthesis transforms are accepted. This process can lead to excessive runtimes required to synthesize and implement a satisfactory logic design on target device 100. Moreover, physical synthesis becomes less effective in improving the timing of a design when using such batch methods for placement legalization.

Figure 5:
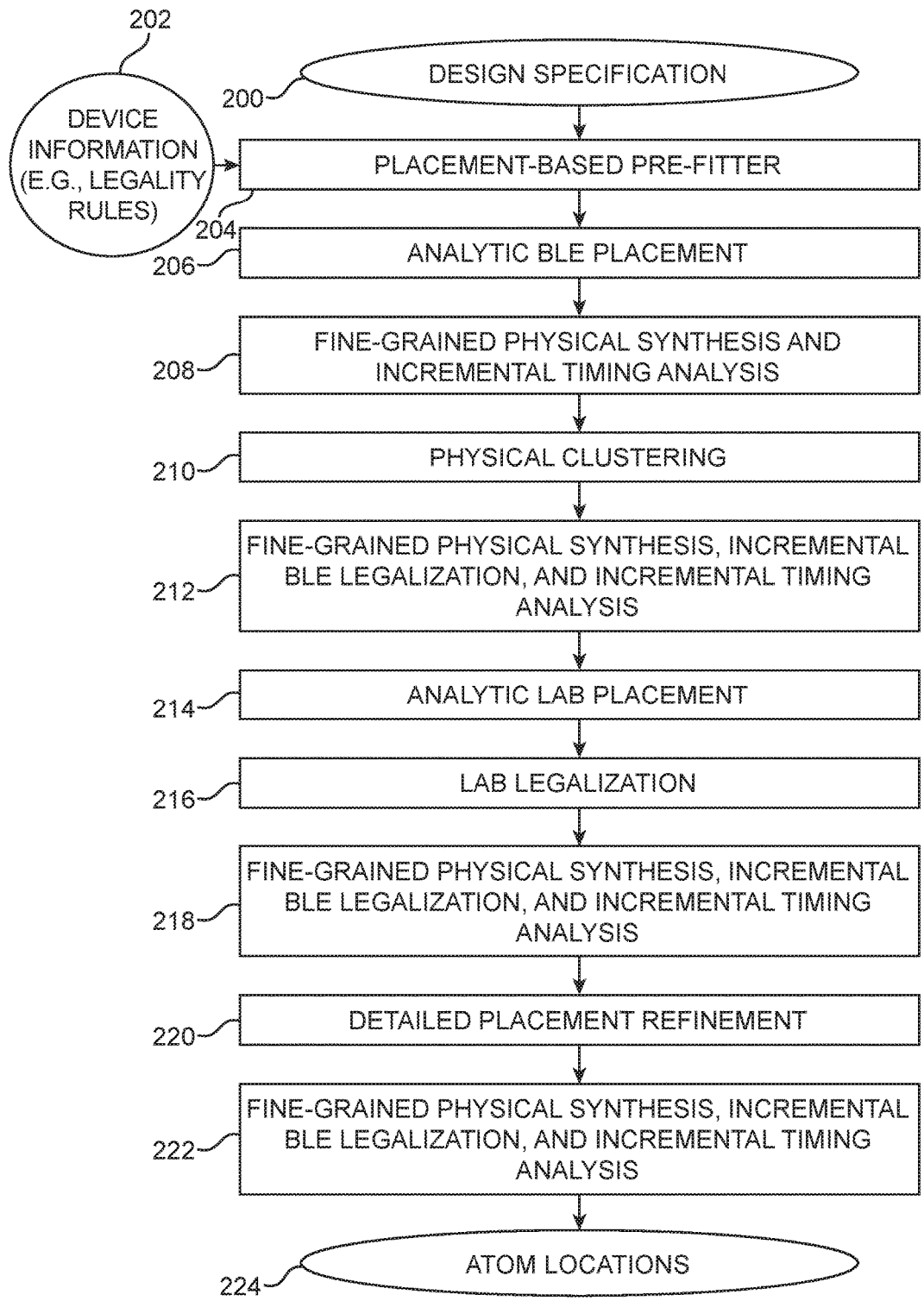
FIG. 5 is a flow chart of illustrative steps for performing multiple incremental physical synthesis and legalization operations on a logic design before outputting a final synthesized logic design for implementation on an integrated circuit in accordance with an embodiment.

In order to improve the efficiency with which an optimal and legal final logic design is synthesized for logic device 100, equipment 156 may perform incremental physical synthesis, legalization, and optimization operations on the logic design. For example, equipment 156 may perform multiple synthesis and legalization operations after performing different adjustments to the logic design prior to saving a final, legal, and optimized netlist for the design. Illustrative operations involved in using tools 162 of FIG. 4 to efficiently produce a final synthesized logic design (e.g., a final netlist) using incremental physical synthesis, legalization, and optimization are shown in FIG. 5. The operations described in FIG. 5 may, for example, be performed by tools on equipment 156 such as a compiler having placement and routing tools 176 of FIG. 4.

As shown in FIG. 5, equipment 156 may identify a design specification 200 and device information 202. Design specification 200 may be the output of a logic synthesis operation that takes as its input a logic designer's design specification (e.g., a register transfer level (RTL) description, etc.). Specification 200 may be a synthesized version of the RTL description that identifies placeable logic elements (e.g., LUTs, FFs, Block RAMS, DSPs, etc.). Design specification 200 may be provided as an input to the placement and routing operations shown in FIG. 5.

Device information 202 may include target information associated with device 100. Device information 202 may include, for example, layout and resource information for device target device 100. This information is generally dictated by the particular architecture of the target device 100 that is being programmed. Information 202 may include resource and legality information for target device 100. Information 202 may be provided by a manufacturer, vendor, or provider of target device 100, for example. The steps of FIG. 5 may be performed to "fit" the user's (e.g., the logic designer's) design onto the FPGA fabric of target device 100 by utilizing the FPGA resources and ensuring that the design is legal on the FPGA physical layout (e.g., as specified by information 202).

Other constraints may be provided to equipment 156 for performing placement operations if desired. Such constraints may include area use, power consumption, timing constraints such as delay minimization, clock frequency optimization, legality rules for the physically synthesized design (e.g., legality rules for the LABs in the design), or any combination thereof. These constraints can be provided for individual data paths, portions of individual data paths, portions of a design, or for the entire design. For example, the constraints may be provided in a constraint file or through user input (e.g., using the design and constraint entry tools 166). The timing constraints are optimization constraints that are sometimes described herein as examples. The timing constraints may include, for example, constraints on timing delays allowed for signals propagating between logic elements (e.g., BLEs, ALMs, and/or LABs) in the logic design (e.g., rules specifying that timing delays between logic elements should be below a threshold timing delay, etc.).

These constraints may target the entire circuit design or portions of the circuit design. For example, some constraints may be defined globally and thus be applicable to the entire circuit design. Other constraints may be assigned locally and thus be applicable only to the corresponding portions of the circuit design (e.g., to individual BLEs, ALMs, or LABs in the design). If desired, multiple different constraints may target the same portion of the circuit design. Such constraints may be read during the operations of FIG. 5 so that tools 162 may optimize the logic, placement, and routing of the design to satisfy the constraints.

At step 204, equipment 156 (e.g., CAD tools 162) may perform placement-based pre-fitter operations on design specification 200. The placement-based pre-fitter operations may involve identifying BLEs, ALMs, and LABs to use in implementing design 200 such that connection constraints in device information 202 are satisfied.

At step 206, equipment 156 may perform analytic BLE placement operations. The analytic BLE placement operations may involve identifying locations within the logic resources of target device 100 at which to place the identified BLEs (e.g., as identified at step 204). The placement of BLEs within the logic design for device 100 may not be a legal placement (e.g., the legality constraints in device information 202 need not be satisfied by the placement of the BLEs performed at step 206).

At step 208, equipment 156 may perform a first incremental (e.g., fine-grained) physical synthesis and incremental timing analysis operation on the logic design having the placed BLEs. For example, equipment 156 may analyze the timing of the logic design having the placed BLEs. Equipment 156 may fine-tune the locations of the BLEs to satisfy timing constraints in information 202. For example, equipment 156 may adjust the locations of the BLEs, analyze the timing of the adjusted BLEs, and repeat this process until any timing delays between the BLEs in the adjusted design are acceptable (e.g., below corresponding threshold times). Performing the incremental physical synthesis operation may modify the corresponding netlist for the design and re-synthesize pieces of logic in the netlist incrementally to address any timing constraint violations that arise. Physical synthesis also performs incremental placement operations for any BLEs in the netlist for the design.

At step 210, equipment 156 may perform physical clustering operations (e.g., after the BLEs have been placed at timing-optimal locations at step 208). The physical clustering operations may involve clustering the placed BLEs into one or more ALMs that are packed into one or more LABs. The clustering may be based on the physical locations of the placed BLEs, if desired (e.g., BLEs that are located near to each other in the placed design may be clustered together within a corresponding LAB whereas BLEs that are relatively far apart in the design are not clustered together within a LAB). Performing the clustering operations may change the physical location of the BLEs within the logic design. Consider an example in which a first BLE is placed at a location (X,Y) and a second BLE is placed at a location (X+3,Y) in the design (e.g., while processing step 208). These BLEs may be clustered together to form a single LAB centered at a position other than the position of the first and second BLEs, such as the location (X+1.5,Y) that is interposed between the original locations of the first and second BLEs. This may move the BLEs to other locations on the floorplan that are different from the locations identified at step 208.

Because the location of the BLEs may change upon clustering, the timing associated with the new locations of the BLEs needs to be analyzed to ensure that the timing constraints are satisfied. In addition, the new locations of the clustered BLEs have not yet been legalized (e.g., the clusters themselves are legal in terms of connection and other ALM/LAB packing rules but are not yet placed legally on the floorplan of device 100).

At step 212, equipment 156 may perform an incremental, timing-driven and fine-grained physical synthesis and legalization operation on the logic design having the clustered BLEs. If the new locations of the clustered BLEs do not satisfy timing constraints (e.g., if there is excessive timing delay between the BLEs), the BLEs may be re-clustered into different LABs or ALMs and the timing may be analyzed until the timing constraints are satisfied. This process may involve determining whether the clustering of the BLEs satisfies packing legalization constraints. If the clustering of the BLEs does not satisfy the packing legalization constraints, the BLEs may be re-clustered until both the timing is optimized and the packing legalization constraints are satisfied.

Re-clustering the BLEs may place the BLEs at new locations within the design. These new locations may be locations that satisfy cluster legality (e.g., such that the clusters are legally packed) while also satisfying timing constraints. Re-clustering BLEs may affect the packing legality of other BLEs in the design. Thus, this process may be repeated recursively until each of the re-clustered BLEs (LABs) are legally packed.

The locations of the newly generated LABs (e.g., the LABs after the BLEs have been re-clustered) may not be the optimal locations with regards to the timing of the design. At step 214, equipment 156 may perform analytic LAB placement operations on the logic design. The analytic LAB placement operations may involve moving the clustered BLEs (e.g., the entire corresponding LABs) to other locations in the design. This may involve moving both the entire LAB and the BLEs clustered within the LAB. Equipment 156 may move an entire LAB to a location that satisfies timing requirements identified by constraints 202 (e.g., to a location having minimal timing delay relative to the other LABs or to the closest location that results in a timing delay that is less than a threshold time). Analytic LAB placement may also optimize the wiring that is used, may optimize routing congestion, and may minimize LAB placement overlap. In the example where a given re-clustered LAB is centered at location (X+1.5,Y), equipment 156 may determine that the design would have less timing delay if that LAB were centered at location (X+1.5,Y+1). Equipment 156 may then move the LAB to location (X+1.5,Y+1). This process may be performed for all LABs in the design.

However, the new locations of the LABs may not satisfy the chip legality constraints (e.g., the LAB locations after analytic LAB placement may have overlap and may thus fail legality constraints in device information 202). At step 216, equipment 156 may determine whether the new LAB locations satisfy legality constraints identified by information 202. If the legality constraints are not satisfied, the LABs may be moved until legal locations are found. For example, new LAB location (X+1.5,Y+1) may overlap with an existing LAB in the design that cannot be moved. In this scenario, the given LAB may be moved (e.g., "snapped") to a different location such as (X+2,Y+2) that is unoccupied and therefore legal. By repeating this process for all LABs in the design, equipment 156 can satisfy the legality constraints for each of the LABs across the entire logic design (e.g., across the entire floorplan of target device 100).

At step 218, equipment 156 may perform another incremental physical synthesis, timing analysis, and legalization operation on the design to modify the netlist and re-synthesize and re-place pieces of logic incrementally to address any timing constraint violations and while ensuring that chip legality is satisfied. In this step, the LABs in the design may already satisfy all chip legality constraints prior to performing the incremental physical synthesis, timing analysis, and legalization operation (e.g., because the LABs were legalized at step 216 prior to performing step 218). If the new (legal) LAB placements do not satisfy timing constraints, equipment 156 may move the LABs to new locations that satisfy both the timing constraints and the legality constraints (e.g., to a nearest free location that improves the timing delay). If a desired location to move a given LAB is full, a LAB at the desired location may be moved to another empty location on the design if possible. This process may be repeated recursively until each of the LABs are snapped to a legal location in the design, such that the timing of the design is improved. The logic design may now be legal (e.g., the placement of each of the BLEs, ALMs, and LABs in the design may satisfy the legality constraints in device information 202 as well as packing legality constraints).

At step 220, equipment 156 may perform detailed placement refinement operations on the legal logic design. For example, equipment 156 may fine tune the BLEs contained in LABs as well as the placement of the LABs within the design so that any other desired constraints in information 202 are satisfied, and metrics such as the timing of the design are further improved.

At step 222, equipment 156 may perform another incremental physical synthesis, timing analysis, and legalization operation on the design to modify the netlist and re-synthesize and re-place pieces of logic incrementally to address any timing constraint violations and while ensuring that chip legality is satisfied. If the new (legal) LAB placements do not satisfy timing constraints, equipment 156 may move the BLEs on timing-critical paths to new locations that satisfy both the timing constraints and the legality constraints (e.g., to a nearest free location that improves the critical path that is being optimized by physical synthesis).

Performing this final synthesis may generate a final, physically synthesized, optimized, and legalized logic design 224. Logic design 224 may sometimes be referred to herein as the final logic design. Final logic design 224 may have optimal timing (e.g., an acceptable timing having timing delays that are less than a threshold timing delay or a minimal timing delay of all possible designs for implementing specification 200). Final logic design 224 may be a data structure such as a netlist file (sometimes referred to herein as a final netlist), where each of the logic elements (e.g., BLEs, ALMs, and LABs) in the design have legal placement locations.

By performing multiple, incremental physical synthesis, timing optimization, and legalization operations (e.g., by distributing the physical synthesis, timing optimization, and legalization operations across steps 212, 218, and 222), the logic design may be incrementally altered and verified prior to outputting the final design. In this way, legalization for the design may be ensured after each adjustment to the logic design for satisfying the optimization (e.g., timing) constraints. This may allow adjustment to the design to be dynamically performed as they are needed during the physical synthesis operations. This prevents the need for rejecting or accepting an entire batch of changes such as in scenarios where a single physical synthesis and legalization step is performed after the final placed netlist is generated. This may reduce the overall time and processing power required for generating a final synthesized logic design for implementing on target device 100. Moreover, this fine-grained and incremental physical synthesis ensures that changes that can be legalized successfully can be accepted, independent of changes that cannot be legalized successfully (e.g., only changes that fail to legalize are rejected).

The example of FIG. 5 in which three incremental synthesis, optimization, and legalization operations are performed is merely illustrative. In general, any desired number of incremental synthesis, optimization, and legalization operations may be performed (e.g., one operation, two operations, four operations, five operations, more than five operations, etc.). In general, any desired optimization constraints may be used in place of the timing constraints described in the example above. Any desired legalization rules (e.g., clocking rules) may be used in place of the legality rule against overlapping logic elements described in the example above.

Figure 6:
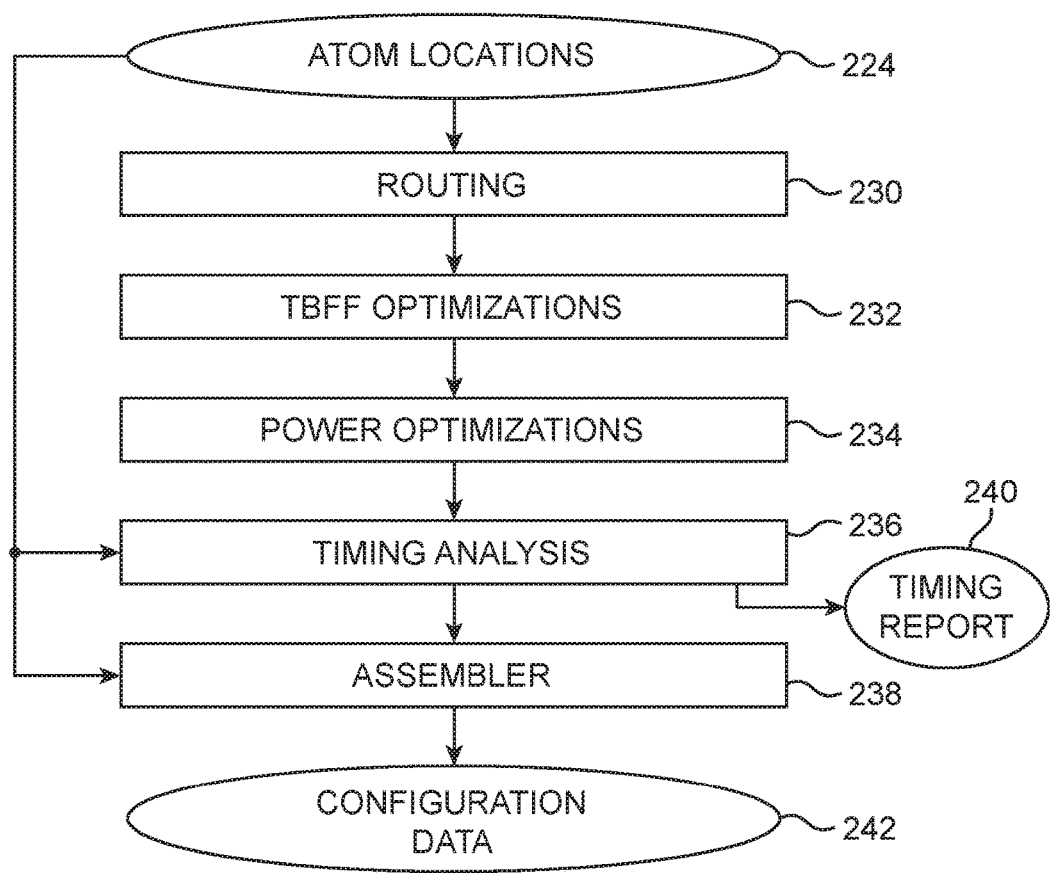
FIG. 6 is a flow chart of illustrative steps for generating configuration data based on a final synthesized logic design for loading onto an integrated circuit in accordance with an embodiment.

Illustrative operations involved in using equipment 156 of FIG. 4 to generate configuration data for configuring target integrated circuit 100 based on incrementally legalized final logic design 224 are shown in FIG. 6.

As shown in FIG. 6, equipment 156 may perform routing operations on physically synthesized logic design 224 at step 230. For example, a compiler engine on placement and routing tools 176 (FIG. 4) may perform the routing operations on the synthesized, placed, optimized, and legalized logic design. Routing may include allocating routing resources on target device 100 to provide interconnections between logic gates, logic elements, and other components on target device 100. Routability optimization is performed on the placed logic design. Routability optimization may reduce the amount of wiring used to connect components in the placed logic design. Routability optimization may include performing fanout splitting, logic duplication, logical rewiring, or other procedures.

At optional step 232, equipment 156 may perform time borrowing flip flop timing (TBFF) optimizations to ensure optimal time borrowing across critical flip flops in the design. Some FPGA architectures support special flip-flops, called TBFFs to allow for such optimizations.

At optional step 234, equipment 156 may perform power optimizations on the design. The power optimizations may ensure that power consumption by the design is optimal (e.g., sufficiently low).

At step 236, equipment 156 may perform timing analysis on the design. The timing analysis may involve analyzing the timing of the design (e.g., to determine signal propagation delay times and other timing characteristics of the final design) and may generate a corresponding timing report such as report 240. Equipment 156 may provide timing report 240 to the logic designer to inform the logic designer of the timing of the final design (e.g., using display or monitor hardware, email reports, messaging, etc.). As the logic design has already been fully timing-optimized and legalized (e.g., prior to generating final netlist 224), no further optimizations or adjustments need be performed on the logic design in response to this timing analysis. In another suitable arrangement, additional optimizations such as optimizations with more accurate signoff multi-corner timing analysis, targeted and incremental fixup style optimizations, or any other desired optimizations or adjustments may be performed at this step.

At step 238, assembler 238 may generate programming files based on the timing analysis and based on final logic design 224. The programming file (sometimes referred to herein as an optimized program file) may include optimized configuration data 242 that includes a bit stream used to program target device 100 (e.g., using configuration device 140 of FIG. 2).

The optimized data file (e.g., optimized configuration data 242) may be transmitted to configuration device 140. Configuration device 140 may load target device 100 with optimized configuration data 242. By programming device 100 with optimized configuration data 242, components on target device 100 are physically transformed to implement the optimized logic design.

Figure 7:
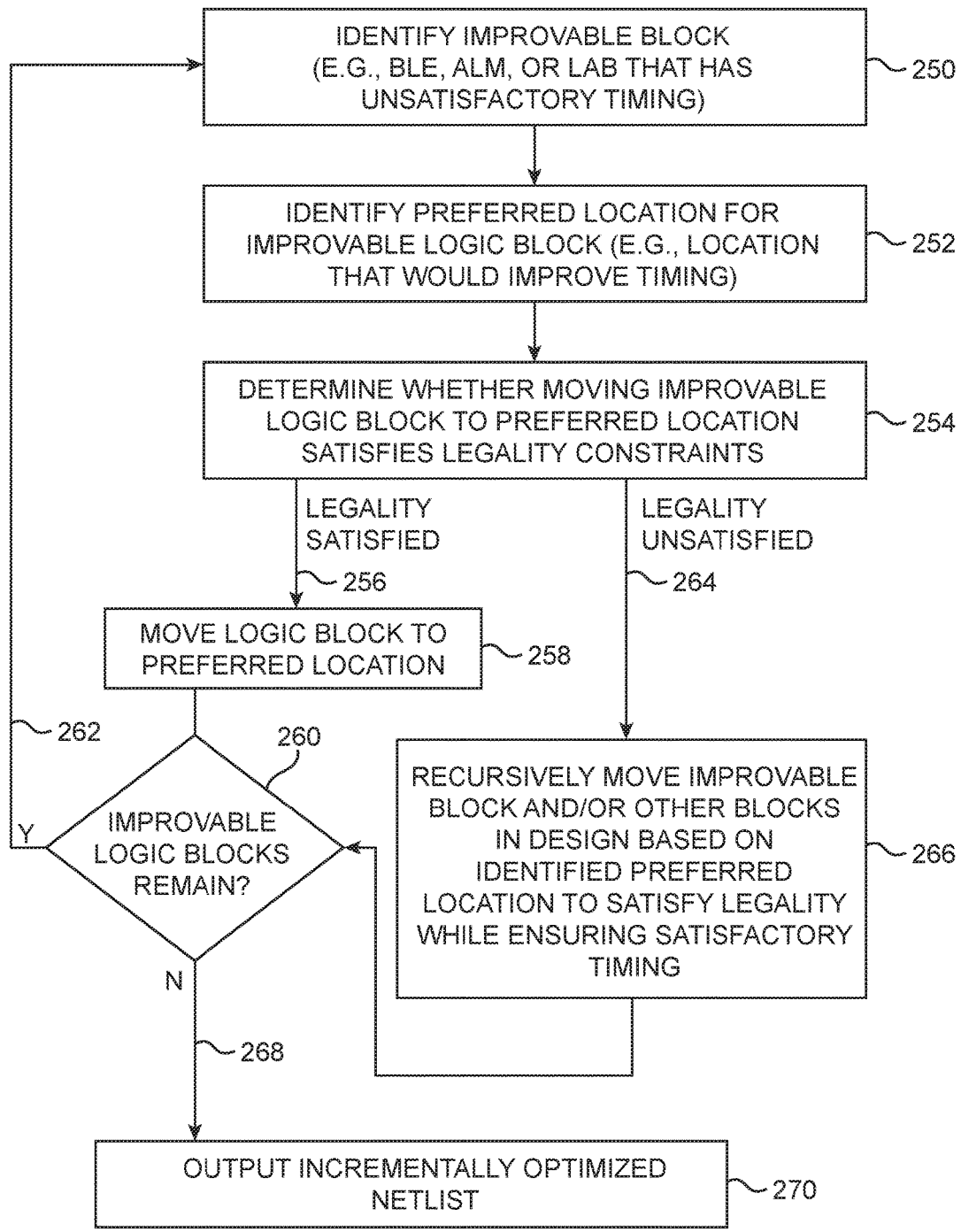
FIG. 7 is a flow chart of illustrative steps for performing an incremental physical synthesis and legalization operation on a logic design in accordance with an embodiment.

FIG. 7 is a flow chart of illustrative steps that may be performed by equipment 156 to incrementally optimize, legalize, and synthesize the logic design. The steps of FIG. 7 may, for example, be performed while processing any of steps 212, 218, or 222 of FIG. 5.

At step 250, equipment 156 may identify a given logic block in the modified logic design that violates a timing constraint. The given logic block may sometimes be referred to herein as an improvable logic block or a failing logic block. The improvable logic block may fail timing constraints or may simply have the capability of improving timing for the system if moved to a new location. The improvable logic block may be a BLE (sometimes referred to herein as an improvable or failing BLE) placed at a location that leads to unsatisfactory timing within the logic design.

For example, at step 212 of FIG. 5, equipment 156 may analyze the timing for each of the clustered BLEs. Equipment 156 may identify a connection as having unsatisfactory timing (e.g., excessive signal propagation delay). In this case, the BLEs on the connection can be optimized and/or re-placed and are referred to as the improvable logic blocks. The improvable BLE may, for example, have a timing delay that is less than a satisfactory (maximum) threshold timing delay value. Similar blocks may be identified at steps 218 and/or 222 (e.g., to identify improvable BLEs that have unsatisfactory or improvable timing after analytical LAB placement and legalization as at step 218 or to identify improvable BLEs that have unsatisfactory or improvable timing after detailed placement refinement as at step 222). The improvable blocks may also include new logic blocks that are created by physical synthesis, for example.

At step 252, equipment 156 may identify a preferred location in the logic design for the identified improvable logic block. The preferred location may be, for example, any desired location such that the timing constraints would be satisfied if the improvable block were to be placed at that location in the design. As examples, the preferred location may be the nearest location to the improvable block such that the improvable block will then satisfy the timing constraints, a location that would produce a minimal timing delay in the system, a location adjacent to the improvable block in the design, or any other desired location for testing.

At step 254, equipment 156 may determine whether moving the identified improvable block to the identified preferred location would satisfy legality constraints. For example, equipment 156 may determine whether the preferred location is occupied by other BLEs, may determine whether the preferred location would satisfy clocking rules, etc. If the legality constraints would be satisfied (e.g., if the preferred location is empty and satisfies the clocking rules), processing may proceed to step 258 as shown by path 256.

At step 258, equipment 156 may move the identified improvable block to the identified preferred location. Processing may then proceed to step 260.

At step 260, equipment 156 may determine whether improvable logic blocks (e.g., improvable BLEs) remain in the logic design for processing. If improvable logic blocks remain, processing may loop back to step 250 as shown by path 262 to move additional improvable BLEs in the logic design. When there are no longer any improvable blocks remaining (e.g., all the BLEs satisfy the legality constraints and the timing constraints), processing may proceed to step 270 as shown by path 268.

If the legality constraints would not be satisfied if the identified improvable block were to be moved to the identified preferred location, processing may proceed to step 266 as shown by path 264. For example, the legality constraints may not be satisfied if the identified preferred location is occupied by another BLE or if the identified preferred location would fail clocking rules.

At step 266, equipment 156 may recursively move the identified improvable block and/or other logic blocks (e.g., BLEs) in the logic design based on the identified preferred location while also ensuring satisfactory timing (e.g., acceptable timing delays) until legality is satisfied for each of the moved blocks. For example, if the preferred location is occupied by another BLE, the BLE at the preferred location may be moved to another location that satisfied the timing constraints and the legality constraints so that the improvable block may be moved to the identified preferred location. This process may be recursively repeated (e.g., if BLEs are located at the location to which the BLE at the preferred location is to be moved) until legality and timing constraints are satisfied for each block that is moved. If a BLE at the identified preferred location cannot be moved (e.g., because moving the BLE would worsen the timing of the design no matter where it is moved), a different preferred location may be identified for the movable BLE. Similar processes may be performed to ensure that any other desired legality constraints are satisfied (e.g., clocking rules). Any logic block moves that would provide worse timing for the system or that would fail the legalization constraints may be rejected by equipment 156. Equipment 156 may pre-emptively omit any potential logic block moves that are known to cause legalization failures for the logic design.

Once the improvable block has been moved to a new location (e.g., the identified preferred location or another location) that satisfies the timing constraints and the legality constraints, processing may proceed to step 260. At step 260, equipment 156 may determine whether improvable logic blocks (e.g., improvable BLEs) remain in the logic design for processing. If improvable logic blocks remain, processing may loop back to step 250 as shown by path 262 to move additional improvable BLEs in the logic design. When there are no longer any improvable blocks remaining (e.g., all the BLEs satisfy the legality constraints and the timing constraints), processing may proceed to step 270 as shown by path 268.

In some scenarios, the improvable logic blocks may be logic blocks that are identified or created by physical synthesis. In the example described above, one of the transforms that is performed by the physical synthesis is a placement adjustment. In another suitable arrangement, the transform performed by the physical synthesis may involve creation of a new BLE to improve the timing of the design (e.g., logic duplication may be performed to split fan-outs). In this example, once the new block is created by the physical synthesis, the new block needs to be legally placed in the design. Equipment 156 may first compute a preferred (but possibly illegal) location for the created block and may then apply the procedure shown in FIG. 7 for the created block in such a scenario. All physical synthesis transforms in a post-legalized netlist may, for example, go through such a process.

Once all of the BLEs have been moved to legal locations that still satisfy the timing constraints for the system (e.g., at step 270), an optimized and synthesized logic design may be output. The optimized and synthesized logic design may be a legal gate level description that maps the moved logic blocks to corresponding physical locations on the design (e.g., a synthesized design that satisfies the legality constraints). For example, the synthesized, optimized, and legalized logic design may be a netlist file or other data structure. The data structure may be stored in temporary memory or cache memory. This process may be performed after each modification to the logic design as performed at steps 210, 216, and 220 of FIG. 5 to ensure that the design is consistently legalized and optimized throughout the place and route process.

In this way, incremental adjustments can be made to the logic design in a legal and timing-optimized manner as the design is synthesized, without the need to re-synthesize the entire design (e.g., without the need to reject or accept an entire batch of changes) after the final netlist is generated. In other words, equipment 156 fully legalizes every logic block move in the logic design before another logic block is moved. This results in a tangible improvement to the functioning of logic design computing equipment 156 itself (e.g., by increasing the speed and efficiency with which the final configuration data is generated), an improvement to the logic design system of FIG. 2 (e.g., by increasing the speed and efficiency with which integrated circuit devices 100 may be programmed with configuration data for performing desired logic functions), and an improvement to the technology of optimizing and implementing logic designs for integrated circuit devices, for example.

Figure 8:
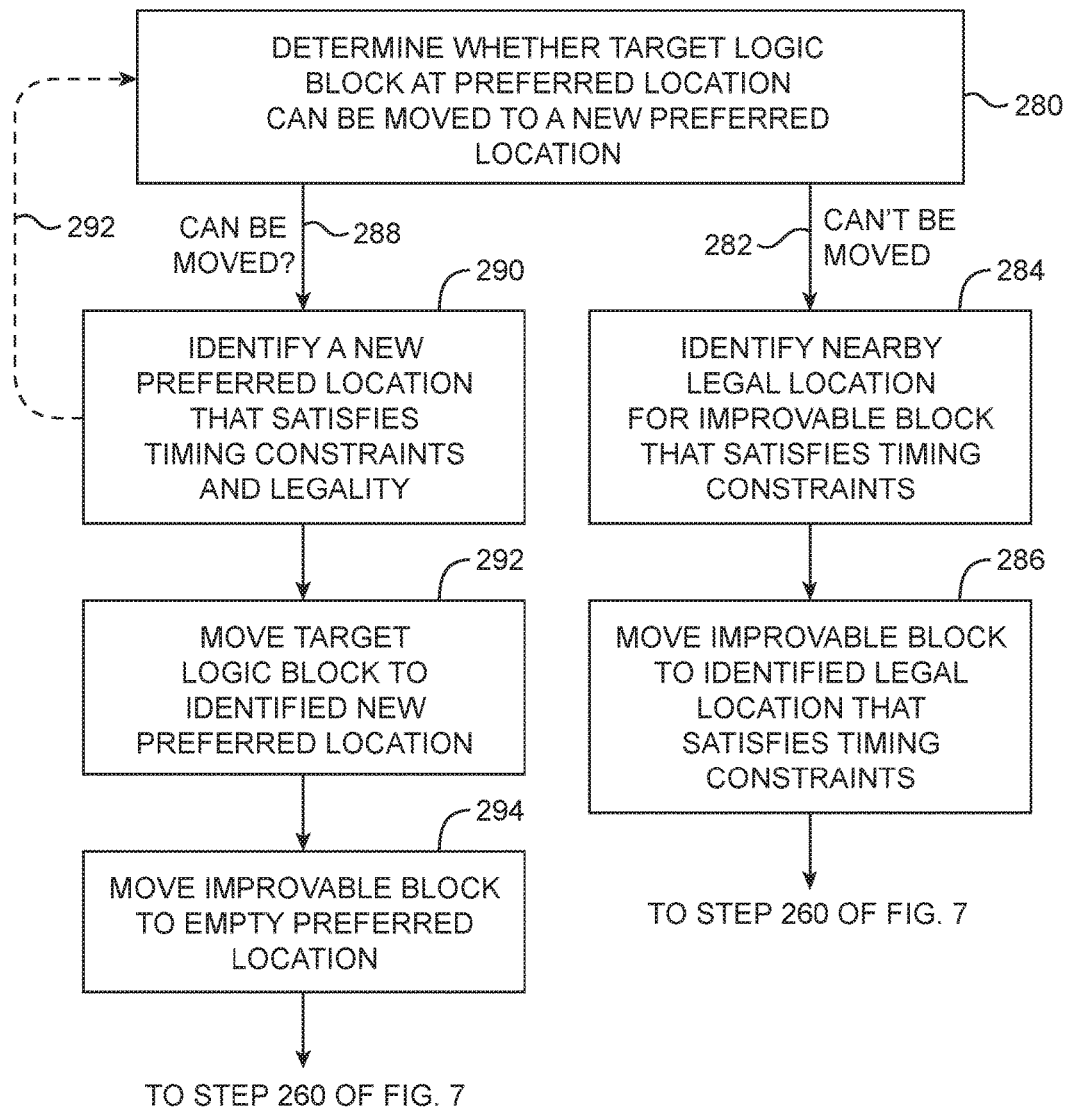
FIG. 8 is a flow chart of illustrative steps for recursively adjusting and legalizing components within a logic design while performing an incremental logic synthesis and legalization operation in accordance with an embodiment.

FIG. 8 is a flow chart of illustrative steps that may be performed by equipment 156 to move an improvable BLE to a preferred location in the logic design in a scenario where moving the improvable BLE to the preferred location would violate the legality rules (e.g., when the preferred location is occupied by another BLE). The steps of FIG. 8 may, for example, be performed while processing step 266 of FIG. 7.

At step 280, equipment 156 may determine whether the BLE at the preferred location (referred to herein as the "target logic block" or "target BLE") can be moved to a new preferred location. For example, equipment 156 may determine whether moving the target BLE would violate timing constraints or legality constraints if moved from the preferred location. If the target BLE cannot be moved (e.g., if moving the target BLE would in itself violate legality or timing constraints in the design), processing may proceed to step 284 as shown by path 282. For example, the target BLE may already be at a timing-optimal location in the design and moving the target BLE may cause the target BLE to have a timing delay that exceeds a maximum allowable timing delay. As another example, the target BLE may be required to be at the preferred location to serve as an interface between two other BLEs at specific locations in the design. Target BLEs that cannot be moved may sometimes be referred to herein as critical BLEs or critical blocks.

At step 284, equipment 156 may identify a nearby legal location in the design for the improvable BLE that would also satisfy the timing constraints. For example, equipment 156 may identify another location to move the improvable BLE that still satisfies timing for the improvable BLE. The location may be the closest empty (legal) location to the preferred location or to the original location of the improvable block that also satisfies the timing constraints. Alternatively, the location may be an empty location having an optimal timing (e.g., a minimal timing delay for the improvable BLE), or may be any other location satisfying both the legality and timing constraints.

At step 286, equipment 156 may move the improvable BLE to the identified location that satisfies both the legality and timing constraints (e.g., as identified at step 284). Processing may then proceed to step 260 as shown in FIG. 7.

If the target BLE (e.g., the BLE at the preferred location) can be moved, processing may proceed to step 290 as shown by path 288. The target BLE may be movable if, for example, the target BLE has non-zero timing slack or a timing slack that is greater than a minimum slack threshold value. Moving the BLE may affect the timing delay (e.g., signal propagation delay) associated with the BLE. The BLE has non-zero timing slack if the BLE can be moved such that an increase in the timing delay does not exceed a maximum allowable delay value (e.g., a maximum timing delay threshold) after moving the BLE. BLEs having non-zero slack (e.g., movable BLEs) or BLEs having a positive slack that is greater than a minimum slack threshold value may sometimes be referred to herein as non-critical blocks or non-critical BLEs. BLEs having timing slack that is greater than the minimum slack threshold may sometimes be referenced herein as having non-critical timing slack. While the non-critical blocks may be moved, the non-critical blocks may only be moveable up to a certain point. For example, if the non-critical blocks are moved excessively far away, wire delays induced by the move can cause the design to fail the timing constraints. In general, the non-critical blocks may be moved to locations such that the non-critical blocks can remain non-critical (e.g., moveable blocks have both non-zero and non-critical timing slack and do not become timing-critical after being moved).

At step 290, equipment 156 may identify a new preferred location for the target BLE that satisfies timing and legality constraints for the target BLE. The new preferred location may be the closest empty (legal) location to the preferred location (e.g., the initial location of the target BLE), may be an empty location at which the target BLE would have optimal timing, or may be any other location satisfying both the legality and timing constraints for the target BLE. If the new preferred location for the target BLE does not satisfy the legality constraints (e.g., if the new preferred location is full), processing may recursively loop back to step 280 as shown by dashed path 292, with the target BLE becoming the new improvable block and the BLE at the new preferred location becoming the new target BLE.

At step 292, equipment 156 may move the target BLE to the new preferred location (e.g., as identified at step 290). When processing recursively loops back over path 292, equipment 156 may repeat processing until each improvable BLE and each target BLE is moved to a suitable location that satisfies the legality and the timing constraints for each BLE that is moved.

At step 294, equipment 156 may move the initial improvable BLE (e.g., as identified at step 250 of FIG. 7) to the empty preferred location (e.g., because the initial target BLE has been moved to a new location and left the preferred location empty). At this point, each of the BLEs are at locations in the logic design that satisfy the timing and the legality constraints. Processing may subsequently proceed to step 260 of FIG. 7. Similar steps may be performed to ensure that any desired legality rules (e.g., clocking rules) are satisfied while also satisfying the timing constraints.

FIGS. 9-12 are diagrams illustrating one example of how a round of incremental synthesis, optimization, and legalization operations may be performed on a logic design to recursively move BLEs in the logic design to locations that satisfy timing and legality constraints. The example shown in FIGS. 9-12 may be generated while processing any of steps 212, 218, and 22 of FIG. 5 or while processing the steps of FIGS. 7 and 8, for example.

Figure 9:
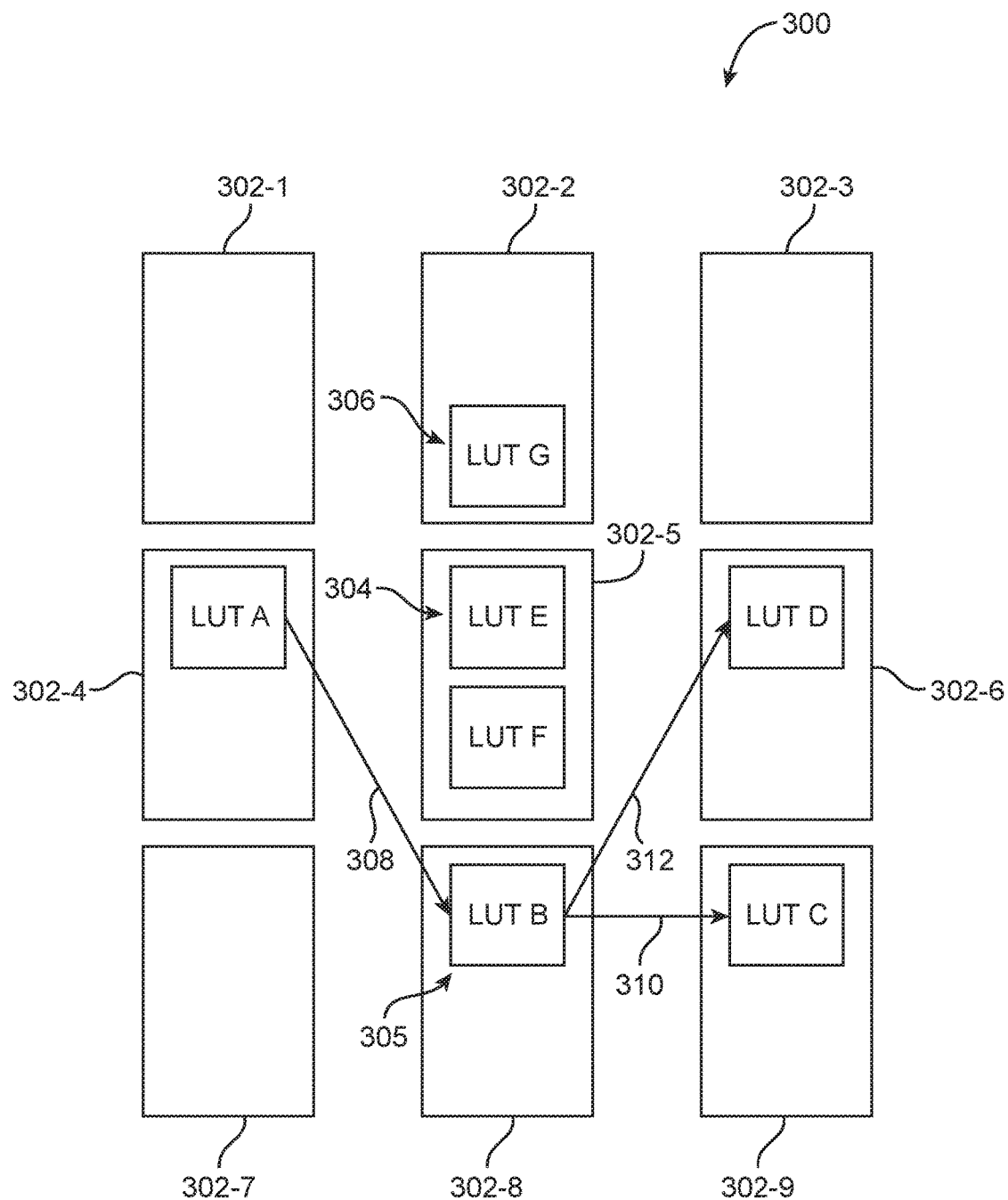
FIGS. 9-12 are illustrative diagrams showing how components within a logic design may be adjusted and legalized while performing an incremental physical synthesis and legalization operation in accordance with an embodiment.

As shown in FIG. 9, equipment 156 may perform a round of incremental synthesis, optimization, and legalization on logic design 300. Logic design 300 may include nine LABs 302 at different locations in a three-by-three grid (e.g., a first LAB 302-1, a second LAB 302-2, a third lab 302-3, etc.). BLEs may be clustered into ALMs that are grouped into the LABs. In the example of FIG. 9, each BLE is a look up table (LUT) clustered within a corresponding LAB (e.g., a first BLE "LUT A" is located in LAB 302-4, a second BLE "LUT B" is located in LAB 302-8, a third BLE "LUT C" is located in LAB 302-9, a fourth BLE "LUT D" is located in LAB 302-6, fifth and sixth BLEs "LUT E" and "LUT F" are located in LAB 302-5, and a seventh BLE "LUT G" is located in LAB 302-2). This example is merely illustrative and, in general, any desired BLEs may be clustered within any desired LABs and the BLEs may include flip flops or other basic logic elements. The placement of the BLEs in FIG. 9 may be generated by equipment 156 after clustering the BLEs into ALMs and LABs 302 (e.g., while processing step 212 of FIG. 5), after snapping LABs 302 to legal locations (e.g., while processing step 218), or after fine-tuning the location of LABs 302 after the LABs have already been legalized (e.g., while processing step 222).

The output of LUT A in logic design 300 may be coupled to the input of LUT B over path 308 (e.g., a route or line over which signals may be conveyed from LUT A to LUT B). The output of LUT B may be coupled to the input of LUT D in LAB 302-6 over path 312 and to the input of LUT C in LAB 302-9 over path 310. The delay of the path from LUT A to LUT D consists of the signal propagation delay of routing wires 308 and 312 as well as the combinational signal propagation delay through LUT B. The placement of LUT A, LUT B, and LUT D determine the signal propagation delays of the routing wires 308 and 312. Similarly, the delay of the path from LUT A to LUT C includes the signal propagation delay of routing wires 308 and 310 as well as the combinational signal propagation delay through LUT B. The placement of LUT A, LUT B, and LUT C determine the signal propagation delays of the routing wires 308 and 310.

As an example, the propagation delay for signals from LUT A to LUT D may exceed a maximum signal delay threshold, and the path from LUT A to LUT D may thus be timing critical. In other words, the placement of LUT B may be sub-optimal and may result in increased signal propagation delays on routing wires 308 and 312. It may therefore be desirable to move LUT B to a different location that improves the signal propagation delay for the path from LUT A to LUT D through LUT B. For example, placing LUT B at location 304 in LAB 302-5 may significantly reduce the path length for signals routed from LUT A to LUT D through LUT B, such that the signal propagation delay associated with LUT B (for wires connected to LUT B from LUT A and to LUT D) is less than the maximum signal delay threshold or otherwise optimized. Equipment 156 may thereby identify LUT B as an improvable BLE (e.g., while processing step 250 of FIG. 7) and may identify location 304 as a preferred location for the improvable BLE (e.g., while processing step 252 of FIG. 7).

However, in the example of FIG. 9, preferred location 304 may not be a legal location for moving LUT B because location 304 is already occupied by LUT E (e.g., location 304 fails legality for LUT B). Equipment 156 may, for example, identify that moving LUT B to location 304 would not satisfy legality while processing step 254 of FIG. 7.

Equipment 156 may identify critical and non-critical BLEs in design 300. For example, equipment 156 may identify that LUTs A, F, D, B, and C are critical BLEs that cannot be moved. That is, these LUTs are on paths that are timing critical. Equipment 156 may identify that target block LUT E is non-critical (e.g., while processing step 280 of FIG. 8). LUT E may, for example, have positive timing slack such that LUT E can be moved to a different location in design 300 without becoming timing critical. The amount of this movement is governed by the amount of positive slack that LUT E has and physical synthesis legalization accounts for this while moving LUT E to another legal location. In scenarios where LUT E cannot be moved (e.g., in scenarios where LUT E is a critical block), equipment 156 may move LUT B to a different location in design 300 (e.g., while processing steps 284 and 286 of FIG. 8) or may leave LUT B at its present location (e.g., if no other legal locations exist in the design that would improve the timing for LUT B).

In some scenarios, the improvable block may also be a critical block that cannot be moved. In the example of FIG. 9, LUT B may be a critical block that is required to be placed at location 305 (e.g., because location 305 provides the only satisfactory timing delay for the path from LUT A to LUT C through LUT B over routing wires 308 and 310). If desired, equipment 156 may generate a duplicate of LUT B for moving to preferred location 304, so that both paths from LUT A to LUT D as well as from LUT A to LUT C can satisfy the timing constraints. Signals may then be routed from LUT A to LUT D through the duplicate of LUT B at the preferred location to satisfy the timing constraints on the signals that are routed from LUT A to LUT D through LUT B. The duplicate ("DUP B") has the same logic functionality as LUT B.

Figure 10:
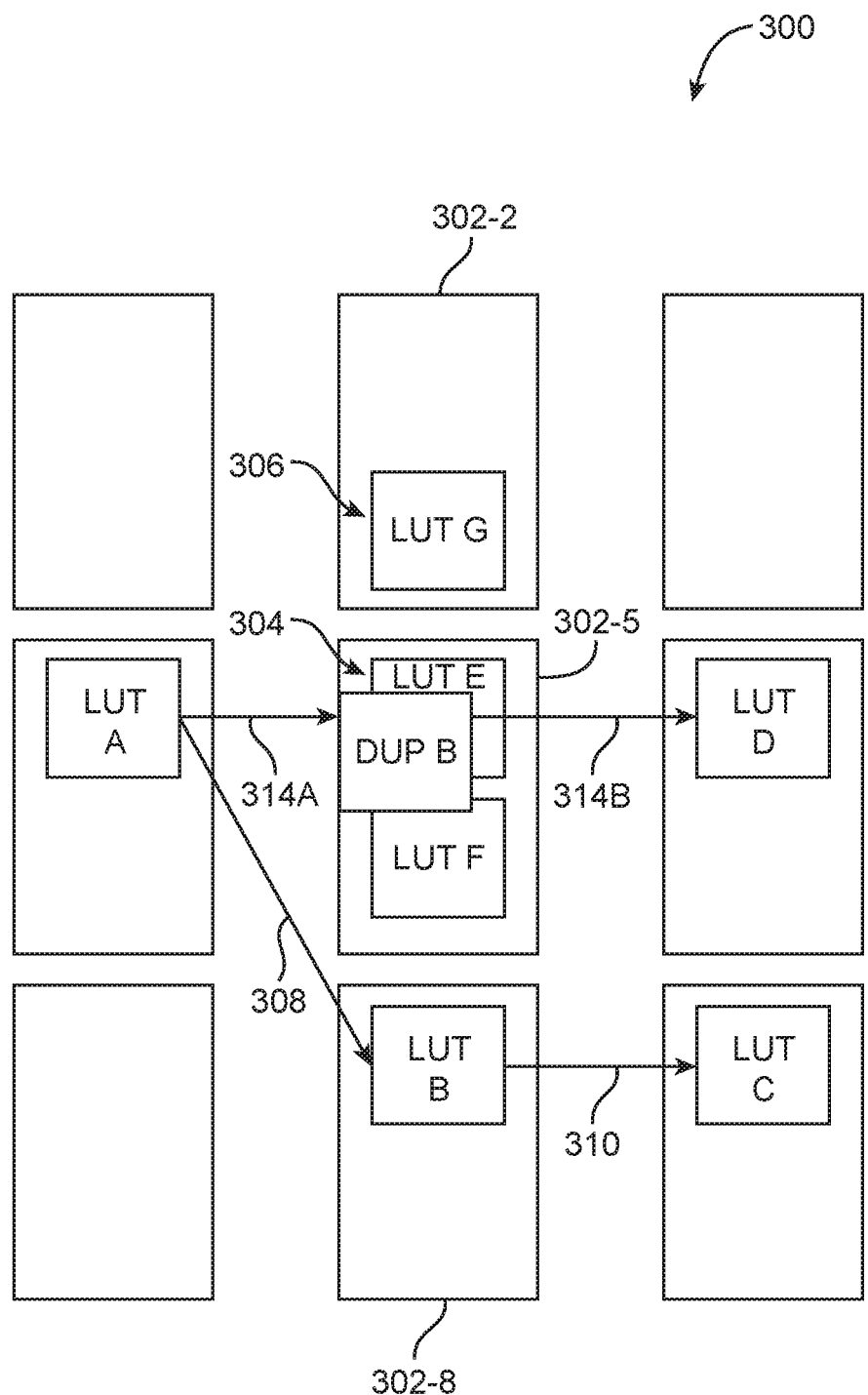

FIG. 10 shows a diagram of how equipment 156 may generate a duplicate of LUT B ("DUP B") for moving to target location 304. As shown in FIG. 10, forming DUP B at location 304 may allow signal paths 314A and 314B to be formed for routing signals from LUT A to LUT D through DUP B. Paths 314A and 314B may have a shorter path length than paths 308 and 312 in FIG. 9 and thus introduce less signal propagation delay to conveyed signals than paths 308 and 312 of FIG. 9. In the example of FIG. 10, location 304 is not a legal location because location 304 is also occupied by LUT E. However, because LUT E is non-critical in this example, equipment 156 may identify a new preferred location for moving LUT E without violating timing constraints for LUT E (e.g., while processing step 290 of FIG. 8). For example, equipment 156 may identify location 306 on LAB 302-2 as the new preferred location for moving LUT E (e.g., a location at which moving LUT E would still allow the system to exhibit satisfactory timing without making the wires connected to LUT E as critical).

Figure 11:
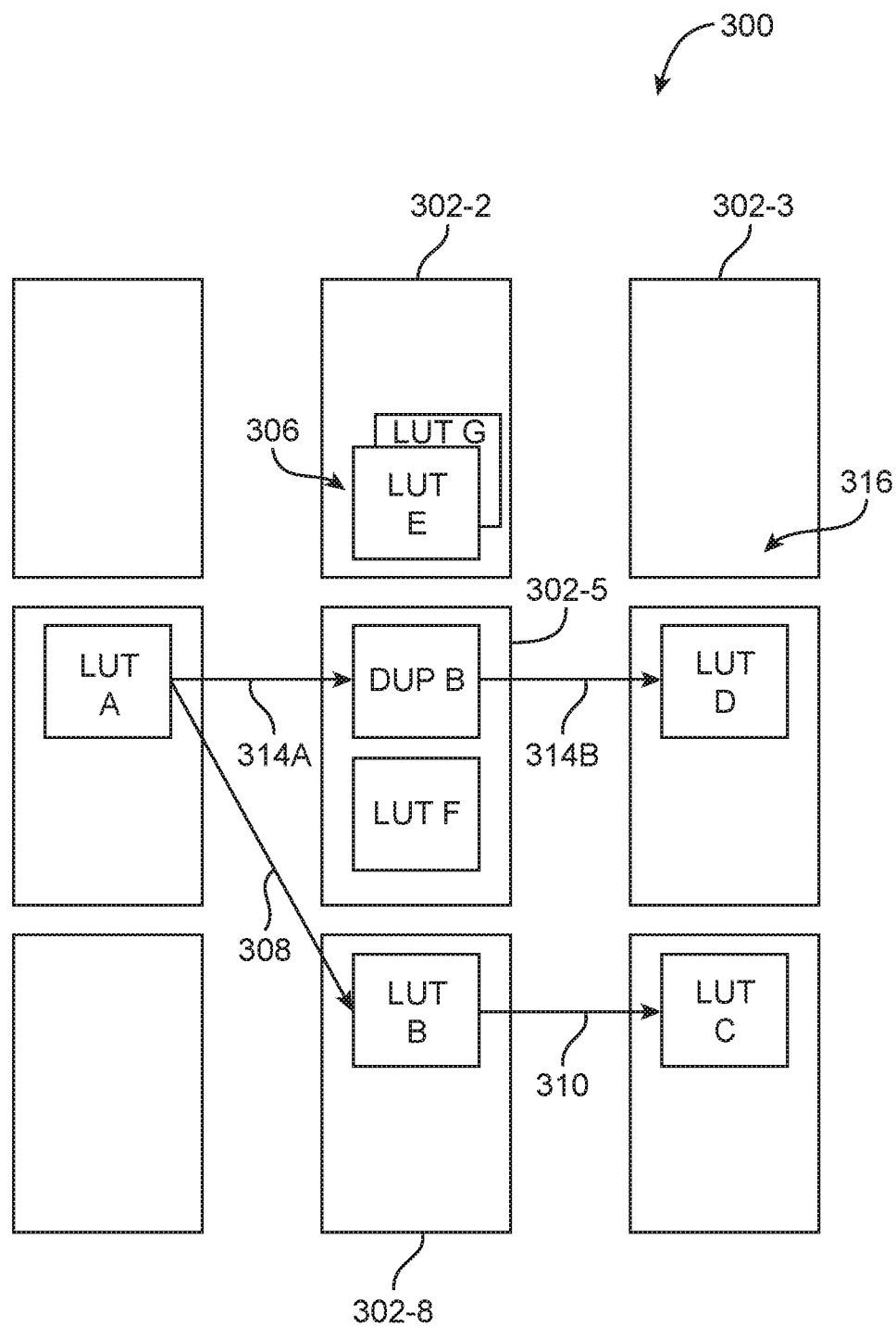

As shown in FIG. 11, equipment 156 may determine that new preferred location 306 for moving non-critical LAB E does not satisfy legality for LAB E, because location 306 is occupied by LUT G (e.g., while processing step 280 after looping back from step 290 over path 292 of FIG. 8, where LUT E becomes the improvable block and LUT G becomes the target block). In the example of FIG. 11, LUT G may be non-critical. LUT G may, for example, have positive timing slack such that LUT G can be moved to a different location in design 300 without introducing excessive timing delay to the system. Equipment 156 may identify a new target location for moving LUT G out of LAB 302-2. The target location may be, for example, location 316 in LAB 302-3 (e.g., a location at which moving LUT G would still allow the system to have satisfactory timing without making the wires connected to LUT G as critical).

Figure 12:
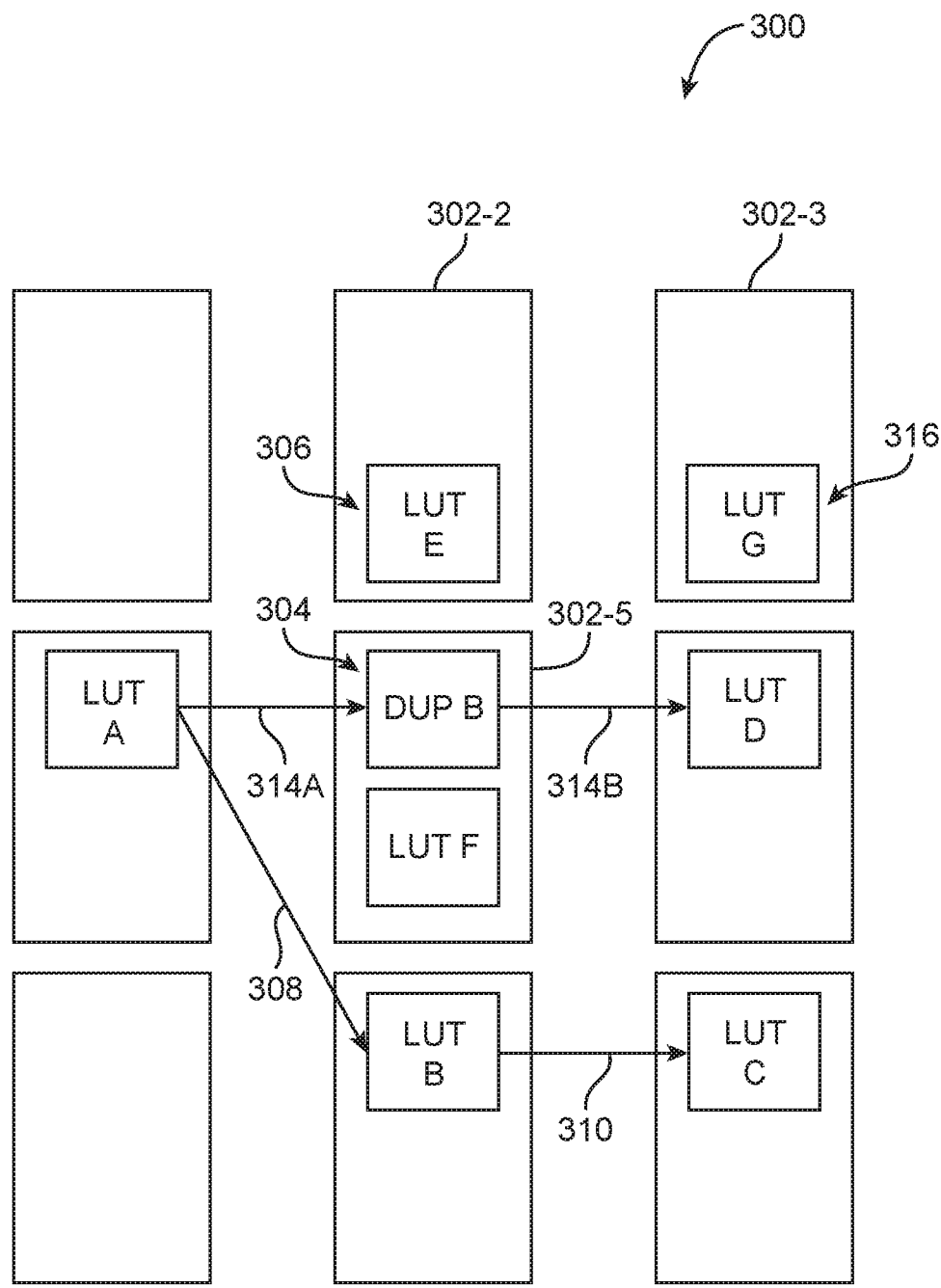

As shown in FIG. 12, because location 316 is empty and thus satisfies the legality constraints, LUT G may be moved to location 316 while still satisfying the timing constraints of LUT G. If location 316 were occupied by another BLE, this process may repeat recursively until each BLE is moved to a legal and timing acceptable location (e.g., as shown by loop path 292 in FIG. 8).

By moving LUT G to location 316, equipment 156 is able to empty location 306 on LAB 302-2. Because location 306 is made empty by moving LUT G to location 316, moving LUT E to location 306 may now satisfy the legality constraints. Equipment 156 may then move LUT E to location 306 in LAB 302-2 while satisfying both timing and legality constraints for LUT E (e.g., while processing step 292 of FIG. 8).

By moving LUT E to location 306, equipment 156 is able to empty initial target location 304 on LAB 302-5. Because location 304 is made empty by moving LUT E to location 306, moving duplicate element DUP B to location 304 now satisfies the legality constraints. Equipment 156 may then move DUP B to location 304 in LAB 302-5 while satisfying both timing and legality constraints for DUP B (e.g., while processing step 294 of FIG. 8). Placing a duplicate of LUT B at location 304 also satisfies the constraint imposed on LUT B requiring a satisfactory signal path between LUT A and LUT C through LUT B in this example. In this way, equipment 156 may satisfy timing constraints on the system (e.g., acceptable timing for signals from LUT A to LUT D is now provided) while also ensuring that legality is satisfied for each of the BLEs, and while ensuring that the path from LUT A to LUT C is not disturbed.

This process may be repeated for any other improvable BLEs in design 300 (e.g., as shown by loop path 262 of FIG. 7). Equipment 156 may then output an incrementally optimized netlist (e.g., while processing step 270 of FIG. 7) or a final netlist 224 (e.g., when processing step 222 of FIG. 5). If desired, other adjustments may be made to the design prior to performing another round of incremental synthesis, timing optimization, and legalization. The example of FIGS. 9-12 is merely illustrative and, in general, any desired legalization rules, BLE structures, ALM and LAB clustering, LAB locations, and block interconnections may be used to optimize and legalize logic design 300. In general, physical synthesis performs many different transformations, only some of which are illustrated in this description. Every transformation of physical synthesis on a post-legalized netlist in the design implementation flow in FIG. 5 ensures that existing or new BLEs created by physical synthesis are incrementally legalized with the procedures outlined in FIG. 7 and FIG. 8.

Each incremental physical synthesis, legalization, and optimization operation (e.g., each of operations 212, 218, and 222 of FIG. 5) may involve identification of a critical region of the design to work on (e.g., a region that fails timing constraints). Equipment 156 may attempt a physical synthesis transform on the identified critical region. This may involve a placement adjustment, logic duplication, combinational re-synthesis, register retiming, or any other desired transform. Equipment 156 may then identify preferred locations for placing existing BLEs and new BLEs that are created by the physical synthesis transform that, when costed with incremental timing analysis, suggest that the timing of the design would be improved. If physical synthesis is performed on a post-legalized netlist, any modified BLEs are also legalized with minimal disturbance to timing in the design. Physical synthesis may cost the legalized netlist again with an incremental timing analysis and may accept the netlist modification if the timing of the design improves, else the move is rejected. Physical synthesis may repeat this process with the other BLEs in the design for optimization.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using logic design equipment to generate configuration data for loading onto a target device, wherein the target device implements a logic design when loaded with the configuration data, the method comprising:
   with the logic design equipment, identifying a given logic block in the logic design that fails to satisfy a timing constraint for the target device;
   with the logic design equipment, identifying a first target location in the logic design at which the given logic block satisfies the timing constraint for the target device;
   with the logic design equipment, creating an empty location at the first target location for the given logic block by moving a target logic block located at the first target location to a second target location in the logic design at which the target logic block satisfies the timing constraint for the target device;
   with the logic design equipment, moving the given logic block to the first target location in the logic design after moving the target logic block to the second target location;
   with the logic design equipment, generating configuration data associated with the logic design for the target device; and
   loading the target device with the configuration data such that the loaded target device implements the logic design.

2. The method defined in claim 1, further comprising:
   with analysis tools on the logic design equipment, determining whether the target logic block located at the first target location in the logic design has non-critical timing slack, wherein moving the target logic block from the first target location to the second target location in the logic design comprises moving the target logic block from the first target location to the second target location in response to determining that the target logic block has non-critical timing slack, and wherein the target logic block does not become timing-critical after being moved to the second target location.

3. The method defined in claim 1, further comprising:
   with the logic design equipment, recursively moving an additional target logic block located at the second target location in the logic design to a third target location in the logic design at which the additional target logic block satisfies the timing constraint for the target device without becoming timing-critical.

4. The method defined in claim 3, wherein moving the target logic block from the first target location to the second target location in the logic design comprises moving the target logic block from the first target location to the second target location after moving the additional target logic block from the second target location to the third target location, and wherein the target logic block does not become timing-critical after being moved to the second target location.

5. The method defined in claim 3, further comprising:
   with the logic design equipment, moving the given logic block to the first target location after moving the additional target logic block from the second target location to the third target location.

6. The method defined in claim 3, wherein the logic design comprises first, second, and third logic array blocks for the target device, and wherein the first target location is in the first logic array block, the second target location is in the second logic array block, and the third target location is in the third logic array block.

7. The method defined in claim 3, wherein the logic design comprises a logic array block for the target device, and wherein the second and third target locations are in the logic array block.

8. The method defined in claim 1, wherein the given logic block comprises a basic logic element for the target device and wherein moving the given logic block to the first target location comprises re-clustering the first basic logic element within an adaptive logic module contained inside a logic array block for the target device.

9. The method defined in claim 8, wherein the target logic block comprises an additional basic logic element for the target device and wherein moving the target logic block from the first target location to the second target location comprises unpacking the additional basic logic element from the adaptive logic module and re-clustering the additional basic logic element within an additional adaptive logic module for the target device.

10. The method defined in claim 8, wherein the basic logic element comprises a logic element selected from the group consisting of: a look-up table, a flip-flop, a carry chain, a digital signal processor, and a block Random Access Memory (RAM).

11. The method defined in claim 8, wherein the logic array block satisfies all chip-level legality constraints for the target device prior to re-clustering the first basic logic element within the adaptive logic module contained inside the logic array block for the logic device.

12. The method defined in claim 1, further comprising:
   saving a netlist file to memory circuitry on the logic design equipment after moving the given logic block to the first target location in the logic design.

13. The method defined in claim 12, further comprising:
   with an assembler on the logic design equipment, assembling the configuration data based on the saved netlist file; and
   with the logic design equipment, transmitting the configuration data to a configuration device that configures the target device using the configuration data assembled by the logic design equipment.

* * * * *